(12) United States Patent
Looze et al.

(10) Patent No.: US 9,877,602 B2
(45) Date of Patent: Jan. 30, 2018

(54) MODULAR CHECK-IN AND BAGGAGE HANDLING SYSTEM AND METHOD

(71) Applicant: EVANS CONSOLES CORPORATION, Calgary, Alberta (CA)

(72) Inventors: Marie Claire Looze, Rotterdam (NL); Arie Bos, Rotterdam (NL)

(73) Assignee: Evans Consoles Corporation, Calgary (CA)

( * ) Notice: Subject to any disclaimer, the term of this patent is extended or adjusted under 35 U.S.C. 154(b) by 0 days.

(21) Appl. No.: 14/824,662

(22) Filed: Aug. 12, 2015

(65) Prior Publication Data
US 2016/0128495 A1 May 12, 2016

Related U.S. Application Data

(60) Provisional application No. 62/036,679, filed on Aug. 13, 2014.

(51) Int. Cl.
*A47B 77/00* (2006.01)
*A47B 87/00* (2006.01)
(Continued)

(52) U.S. Cl.
CPC .............. *A47F 10/02* (2013.01); *A47B 81/00* (2013.01); *B64F 1/366* (2013.01)

(58) Field of Classification Search
CPC ........... A47F 10/02; A47B 81/00; B64F 1/366
(Continued)

(56) References Cited

U.S. PATENT DOCUMENTS

| 1,946,789 A | * | 2/1934 | Giesemann | ............ A47B 88/14 |
| | | | | 312/334.28 |
| 2,211,308 A | * | 8/1940 | Wyman, Sr. | ........... A47K 10/04 |
| | | | | 312/317.1 |

(Continued)

FOREIGN PATENT DOCUMENTS

| CN | 102063751 A | 5/2011 |
| DE | 29922542 U1 | 5/2000 |

(Continued)

OTHER PUBLICATIONS

International Search Report and Written Opinion from corresponding PCT patent application No. PCT/CA2015/050767, dated Nov. 24, 2015.

(Continued)

*Primary Examiner* — Daniel J Troy
*Assistant Examiner* — Timothy M Ayres
(74) *Attorney, Agent, or Firm* — Notaro, Michalos & Zaccaria P.C.

(57) ABSTRACT

A counter module system is provided, which may allow for partial or full self check-in by a passenger at a transportation facility, such as an airport. The system may comprise a counter module having multiple bays each for receiving an equipment module. An equipment module may be compatible for installation in some or all of the bays. Easy customization of equipment may be achieved by installing the desired equipment in an equipment module and then rolling the module into an open bay in the counter module. The modularity may also allow for easy access to equipment for maintenance or resupply. When a piece of equipment stops working, the module containing the equipment may be removed from the bay and either quickly repaired or replaced with another module. The system may also have (Continued)

features for providing proper alignment of an equipment module within a bay of the counter module.

13 Claims, 28 Drawing Sheets

(51) Int. Cl.
　　　*A47B 95/00*　　　(2006.01)
　　　*A47F 10/02*　　　(2006.01)
　　　*B64F 1/36*　　　(2017.01)
　　　*A47B 81/00*　　　(2006.01)

(58) Field of Classification Search
　　　USPC ............ 312/249.8–249.13, 349.35, 198, 312/334.23–334.43
　　　See application file for complete search history.

(56) References Cited

U.S. PATENT DOCUMENTS

| | | | | |
|---|---|---|---|---|
| 2,471,245 | A * | 5/1949 | Shoenberg | A47B 88/0407 312/246 |
| 2,614,017 | A * | 10/1952 | Mugnier | A47B 17/036 108/93 |
| 2,839,349 | A * | 6/1958 | Culver | A47B 88/06 312/323 |
| 2,857,558 | A | 10/1958 | Fiske | |
| 3,936,106 | A * | 2/1976 | Harper | A47B 81/062 312/107 |
| 4,779,941 | A * | 10/1988 | Jessop | A47B 88/14 312/249.9 |
| 4,911,507 | A * | 3/1990 | Leist | A47B 53/02 312/201 |
| 5,070,556 | A * | 12/1991 | Gloger | A47C 17/86 16/35 R |
| 5,381,315 | A | 1/1995 | Hamaguchi et al. | |
| 5,820,239 | A * | 10/1998 | Christenson | F25D 25/025 312/334.14 |
| 6,192,919 | B1 * | 2/2001 | Jackson | B67D 7/0272 137/315.01 |
| 6,412,892 | B1 * | 7/2002 | Bonat | A47B 88/0485 312/334.25 |
| 6,580,604 | B1 | 6/2003 | McAnally et al. | |
| 7,306,301 | B2 * | 12/2007 | Walburn | A47B 88/0485 312/334.27 |
| D716,792 | S | 11/2014 | Looze | |
| 9,033,437 | B2 * | 5/2015 | Klitzing | F25D 25/025 312/334.27 |
| 2010/0046152 | A1 | 2/2010 | Ghobrial et al. | |

FOREIGN PATENT DOCUMENTS

| | | |
|---|---|---|
| DE | 102012013247 A1 | 1/2014 |
| WO | 8906482 A1 | 6/2003 |
| WO | 2012130876 A1 | 10/2012 |

OTHER PUBLICATIONS

European Extended Search Report and Written Opinion, dated Jan. 4, 2016.

* cited by examiner

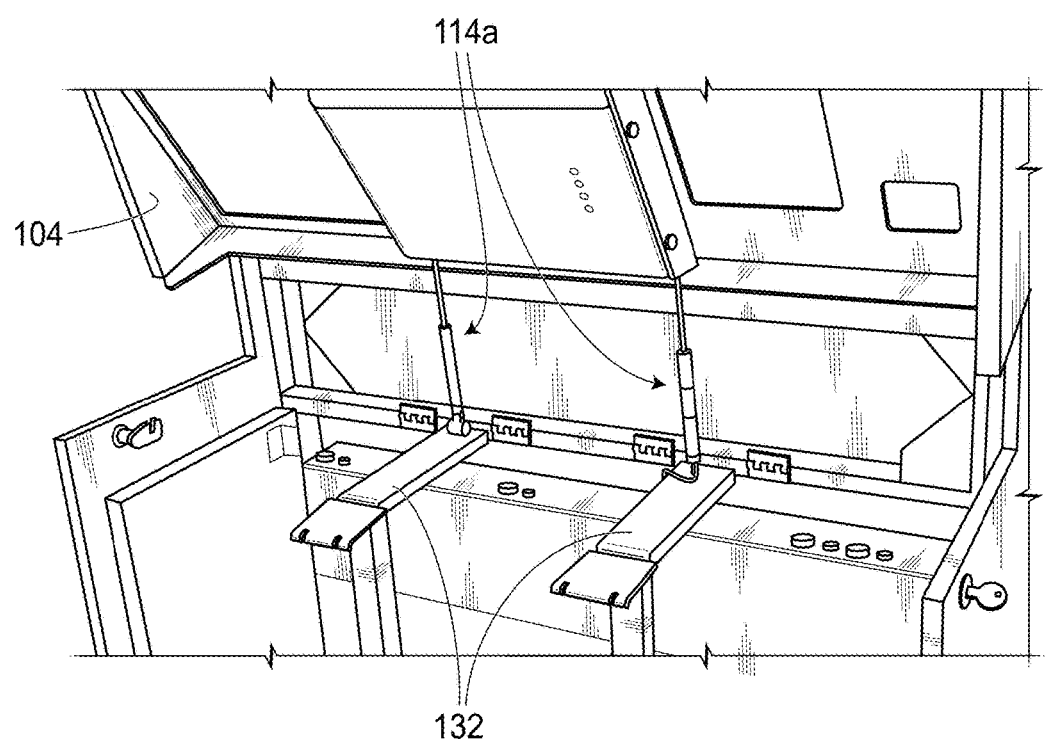
FIG. 4AAA

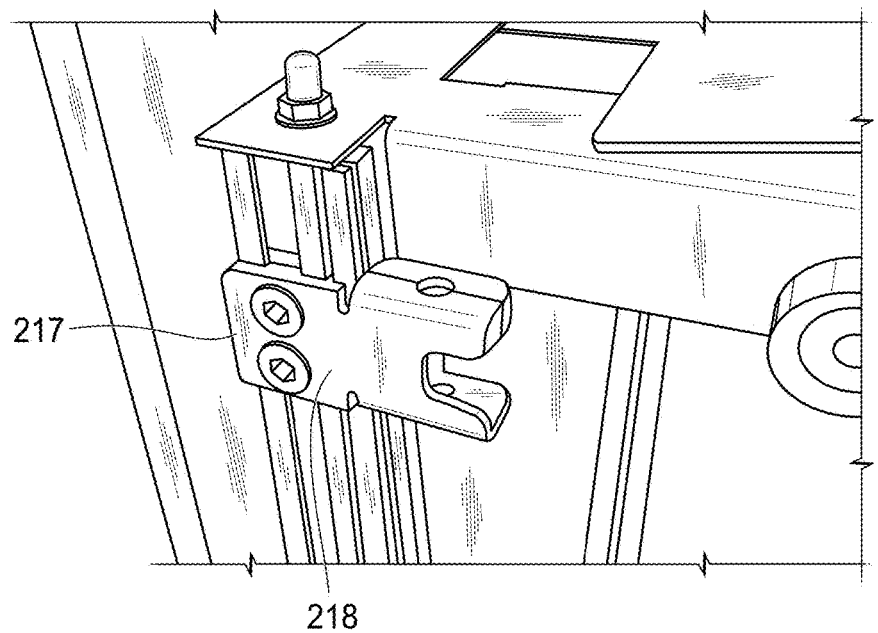
FIG. 4H
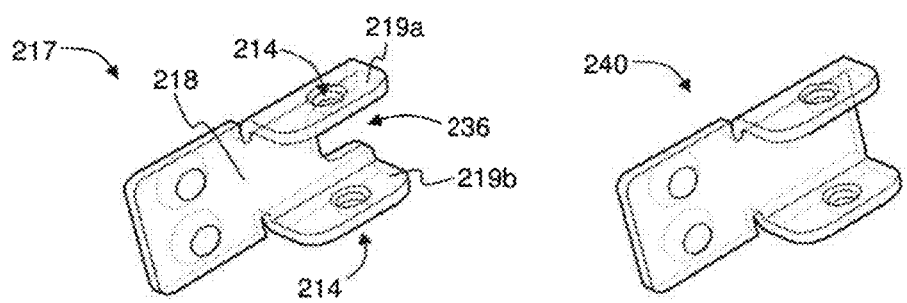
FIG. 4HH      FIG. 4HHH

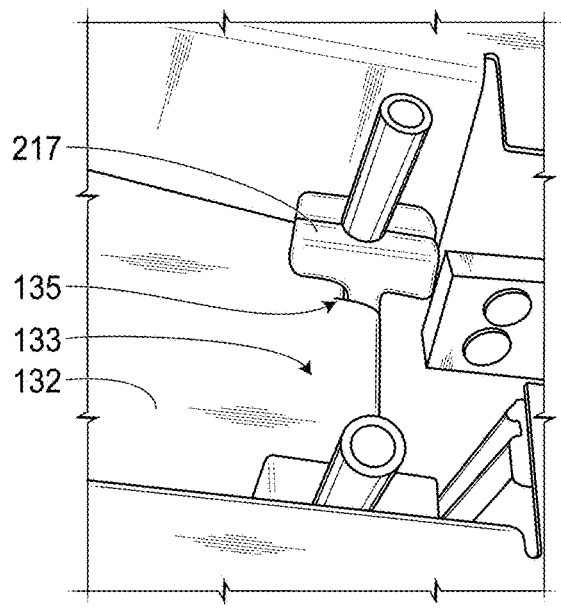
FIG. 4II
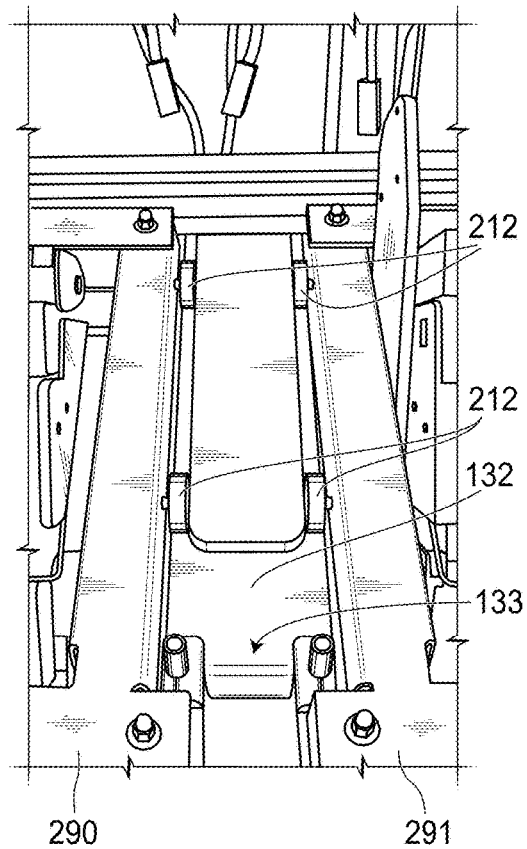
FIG. 4III

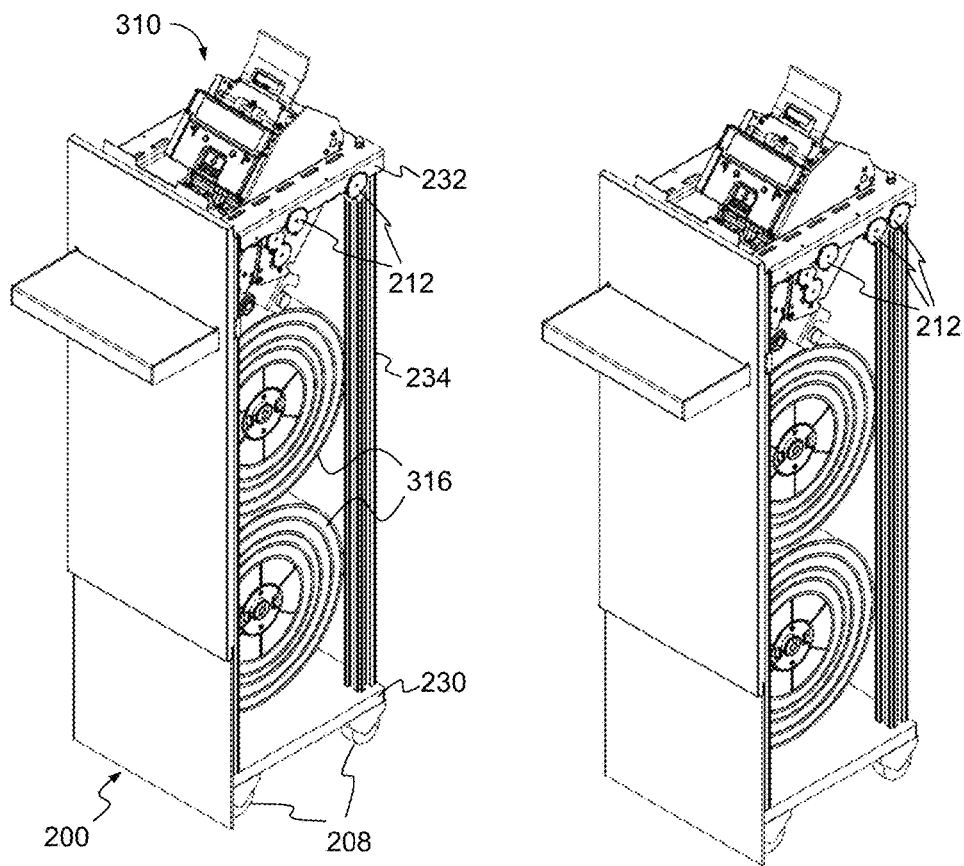
FIG. 5  FIG. 5A

MODULAR CHECK-IN AND BAGGAGE HANDLING SYSTEM AND METHOD

CROSS-REFERENCE TO RELATED APPLICATION

This application claims the benefit under 35 U.S.C. 119(e) of U.S. Provisional Application 62/036,679 filed Aug. 13, 2014, which is incorporated herein by reference in its entirety.

FIELD OF THE DISCLOSURE

The present disclosure relates generally to check-in counters and systems, and more particularly to check-in and baggage handling at an airport.

BACKGROUND

An assisted airport check-in requires a passenger to present him or herself at a service counter staffed by a service representative. The representative manually performs the check-in procedure.

During an assisted check-in, the passenger normally presents travel documentation, such as a ticket, or other information providing proof of the passenger's travel arrangement. The passenger may also present personal identification, such as a passport. The service representative verifies the documentation and may input information into a computer system as part of the check-in procedure. The system may be the passenger check-in and boarding system known as Common Use Terminal Equipment (CUTE) or any other system. The representative may also perform other tasks, such as providing the passenger with a boarding pass, assigning the passenger a specific seat on the airplane, selecting meal preferences, etc.

The check-in process also usually involves baggage handling. The passenger may provide one or more pieces of baggage to be checked, meaning to be placed in a cargo area of the plane. The baggage may be placed on a scale to be weighed, and then on a conveyor for transportation away from the service counter towards a baggage handling area at the airport. The passenger may also present carry-on baggage that the passenger intends to carry on to the plane. This baggage may also be weighed. In addition, the service representative may print or otherwise provide baggage tags for attachment to the checked and carry-on baggage.

Therefore the conventional airport check-in has performed with the assistance of a service representative.

In more recent years, some self-service check-in options have been made available to passengers. For instance, check-in kiosks have been installed at some airports, often with the intended purpose of alleviating congestion and to improve the flow of passengers through the airport. Such kiosks may allow a passenger to perform one or more procedures, including checking-in to their flight, receiving their boarding pass, selecting their seat, etc. One example type of kiosk is a Common Use Self-Service (CUSS) kiosk. CUSS kiosks provide passenger check-in while allowing multiple airlines to maintain branding and functionality.

Although a passenger may be able to check-in using a kiosk, the passenger may still need to visit a service counter for baggage handling. Thus in this sense, the kiosks only provide a partial self-service experience. The passenger must visit both a kiosk and a service counter.

Furthermore, most existing assisted check-in counters are not easily transformable to be able to provide self-service functionality. For example, many of these counters consist of permanent furniture that is adapted for equipment and usage by a service representative located behind the counter. Accordingly, it is difficult and expensive to modify existing assisted check-in counters for self-service use.

BRIEF DESCRIPTION OF THE DRAWINGS

The present disclosure will be better understood having regard to the drawings in which:

FIG. 4AA is a close-up perspective view of the area in FIG. 4A indicated with the dashed line box, however with the top cover propped open;

FIG. 4AAA is a front perspective view of an embodiment with the top cover raised and no equipment modules present;

FIG. 4BB is a side perspective view of an inner side of the top cover of a counter module in an open position;

FIG. 4EE is a close up view of the area indicated by the broken line in FIG. 4E;

FIG. 4H is a close up perspective view of a different stop member at the upper region of an equipment module, similar to the view in FIG. 4EE;

FIG. 4HH is an isolated perspective view of the stop member shown in FIG. 4H;

FIG. 4HHH is an isolated perspective view of yet another embodiment of a stop member;

FIG. 4II is a top close up view of a stop member of a counter module engaged with a counter module;

FIG. 4III is a top view of two equipment modules installed in a counter module;

FIG. 5 is a front perspective view of an equipment module having printing equipment;

FIG. 5A is a front perspective view of another embodiment of an equipment module having printing equipment;

DETAILED DESCRIPTION

Figure 1:
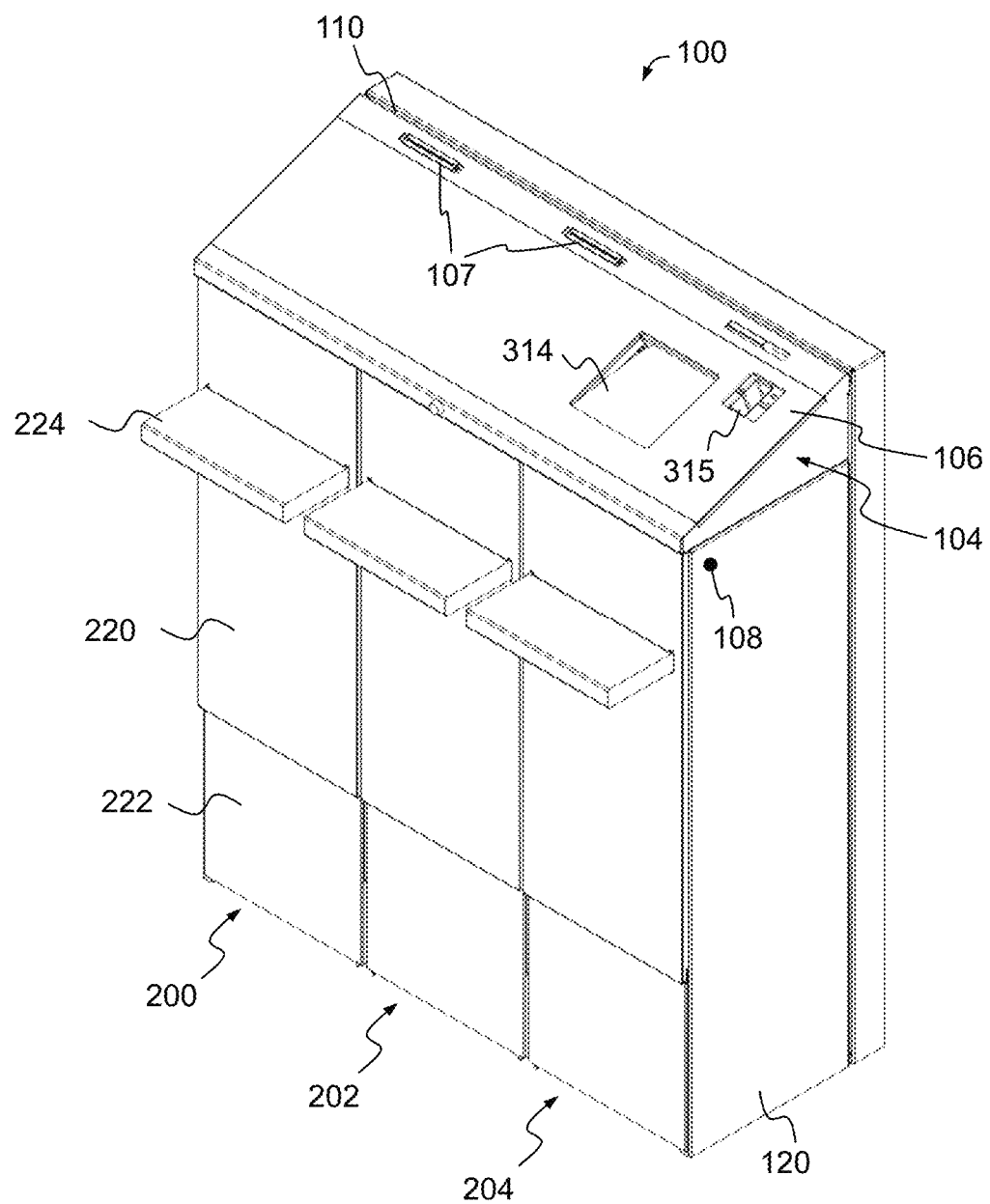
FIG. 1 is a front perspective view of one embodiment of the present counter module.

The present disclosure is described having regard to several embodiments with reference to the Figures. While these embodiments are described generally in the context of check-in counters and systems for airports, the scope of the present disclosure is not intended to be limited to the airport or airplane context. The present disclosure may be used in other applications and in other fields.

Although the term "system" is used in this disclosure, it is not used in a limiting manner. Rather, a check-in "system" generally includes methods, processes, structures, equipment, etc.

In addition to conventional assisted check-ins and partial self-service check-ins, the present disclosure provides full self-service check-in options. One option is a full self-service check-in station, which can allow a passenger to, for example, check-in, choose/change seats, obtain a boarding pass, and obtain any necessary baggage tags and deposit checked baggage for one or more baggage units. Such a full self-service check-in station may not need to be staffed by a service representative since the passenger performs the steps in the check-in procedure. However, service representatives, or "floor walkers" may be still be stationed in self-service check-in areas to help any passengers that require assistance with the check-in equipment or procedure.

In one aspect, the systems provide full or partial self-service check-in capabilities. In some aspects, the systems and equipment allow passengers to drop off their baggage. In other aspects, the systems may support two or more modes of operation, including a self-service check-in mode and an assisted check-in mode.

Thus a check-in system according to the present disclosure may be configured for a desired mode of operation. This can reduce costs by allowing check-in counters to be staffed by service representatives only when necessary. In addition, multi-mode check-in systems may reduce total equipment costs by reducing or eliminating the need for separate assisted check-in and self-service check-in equipment. The present multi-mode check-in systems may also reduce the physical equipment footprint required compared to the combined footprints of separate assisted check-in equipment and self-service check-in equipment.

In some aspects, the present check-in systems may be partially or fully integrated with existing systems or other third party systems, including but not limited to check-in systems, baggage systems and security systems. This integration may include one or more of physical integration, power integration, and data or communications integration.

In other aspects, the present systems provide modularity, which may increase flexibility of placement and orientation of check-in equipment, increase the degree of equipment customization, allow for more efficient reloading and servicing of equipment, and increase efficiencies and effectiveness of operation.

One aspect of the present disclosure is directed to a counter module system, comprising: a counter module defining at least one equipment module bay, the bay comprising: spaced apart and opposing upper equipment module supports extending generally along a length of the bay; and at least one lower guidance support extending generally along a length of the bay; and an equipment module receivable into an equipment module bay of the counter module, the equipment module comprising: an upper guidance member for engaging at least one of the upper equipment module supports in the bay; and a lower guidance member for engaging the lower guidance support of the bay, wherein when the equipment module is moved into the bay, the upper guidance member cooperates with the upper equipment module support to raise the equipment module off of a ground surface to vertically align the equipment module with the counter module, and the lower guidance member cooperates with the lower guidance support of the bay to contribute to the side-to-side alignment of the equipment module with the counter module.

In some embodiments, the lower guidance support of the counter module comprises a pair of opposing rails, and the equipment module comprises at least two lower guidance members where each of the lower guidance members engages a respective rail to contribute to the side-to-side alignment.

In some embodiments, the equipment module comprises at least two front lower guidance members and two rear lower guidance members, where one of each of the front and rear lower guidance members engages one of the rails and the other of the front and rear lower guidance members engages the other of the rails to contribute to the side-to-side alignment.

In some embodiments, the equipment module comprises first and second upper guidance members for engaging each of the opposing upper equipment module supports of the bay.

In some embodiments, at least one of the opposing upper equipment module supports of the bay comprises a guide extending along at least part of the length of the upper equipment module support for engaging the upper guidance member of the equipment module to contribute to the side-to-side alignment of the equipment module with the counter module.

In some embodiments, a front portion of at least one of the opposing upper equipment module supports slopes downwardly to act as a ramp for raising the equipment module off of the ground surface when the equipment module is moved into the bay.

In some embodiments, the equipment module comprises at least two front upper guidance members and at least one rear upper guidance member, where one of each of the front and rear upper guidance members engages one of the opposing upper equipment module supports and the other of the front upper guidance members engages the other of the opposing upper equipment module supports to contribute to the vertical alignment.

In some embodiments, the equipment module comprises a stop member, and the bay comprises a corresponding alignment member defining a substantially vertical notch for receiving the stop member of the equipment module for contributing to the side-to-side alignment of the equipment module with the counter module.

In some embodiments, the stop member defines an opening therethrough, and the alignment member defines a corresponding opening therethrough, such that when the equipment module is fully inserted into the bay, the opening of the stop member aligns with the opening in the alignment member such that an obstruction may be inserted through both openings to releasably secure the equipment module in the bay.

In some embodiments, the counter module comprises two or more equipment module bays arranged in a side-by-side configuration, and wherein the equipment module is compatible with at least two of the bays for selective reception into each of the at least two bays.

In some embodiments, the counter module system further comprises at least one releasable wired electrical connection between equipment positioned at the equipment module and the counter module, wherein one or more cables providing the connection are supported by a flexible cable chain.

In some embodiments, the counter module system further comprises one or more electrical connection ports positioned within the bay of the counter module for connecting to one or more cables providing the wired connection to the equipment positioned at the equipment module.

In some embodiments, the equipment module comprises a printer having an output port that is substantially aligned with an opening in a top cover of the counter module when the equipment is installed in the counter module.

In some embodiments, the equipment module comprises at least one of a passport scanner and a card reader that is substantially aligned with an opening in a top cover of the counter module when the equipment is installed in the counter module.

The various features and components of the present disclosure are now described with reference to the Figures.

FIG. 1 shows a check-in counter module 100. The counter module may be deployed for operation in any suitable manner. FIGS. 8A to 13 show some example deployments.

Figure 8A:
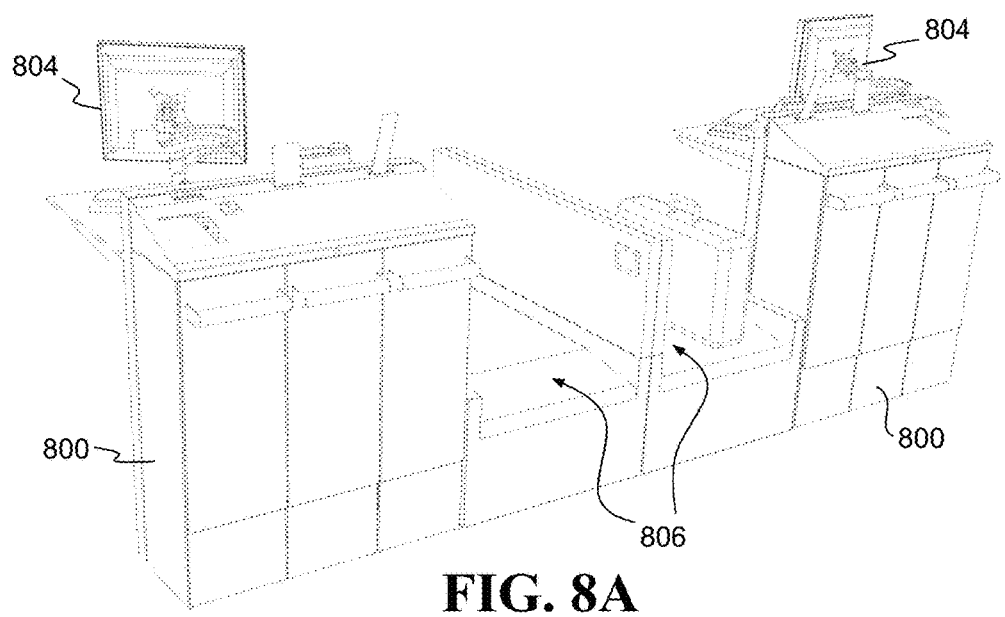
FIG. 8A is a front perspective view of two counter modules deployed in a standalone configuration and adjacent to baggage conveyors.

FIG. 8A shows two counter modules 800 according to the present disclosure deployed in a standalone configuration, meaning that they can completely replace other check-in counter structures. The fronts of the counter modules face outwardly for ease of use by passengers. The counter modules are also shown adjacent to baggage conveyors 806, although this is not necessary. In addition, in some embodiments, the rear sides of the counter modules may be equipped with one or more of a work surface, such as a desktop, and one or more input or output devices, for example for use by a service representative. The input and output devices may comprise displays, keyboards, printers, telephones, etc. For example, FIGS. 8A to 10 show each module comprising a rear-facing display monitor 804.

Figure 8B:
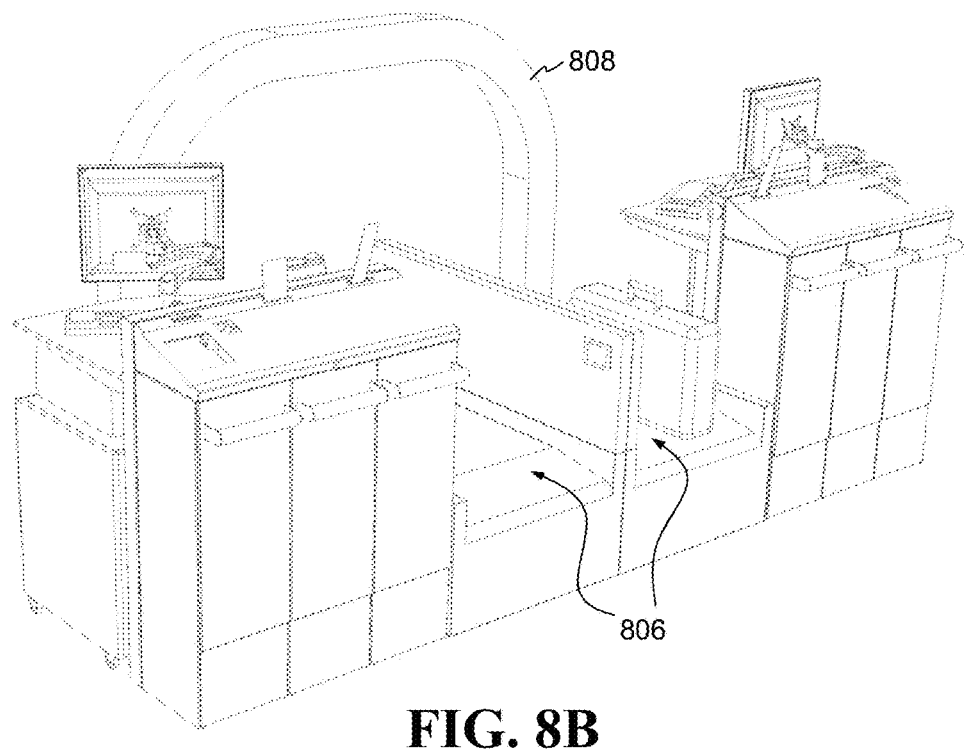
FIG. 8B is a front perspective view of two counter modules deployed in a similar configuration as in FIG. 8A with the addition of a scanning arc over the conveyors.

FIG. 8B shows two counter modules in a similar deployment as those in FIG. 8A but with the addition of a scanning arc 808 disposed about the conveyors 806. Scanning arc or similar equipment may be used for scanning or otherwise screening luggage or other items as they pass past the arc. Scanning may include photographing, x-raying or other types of scanning or sensing.

Figure 8C:
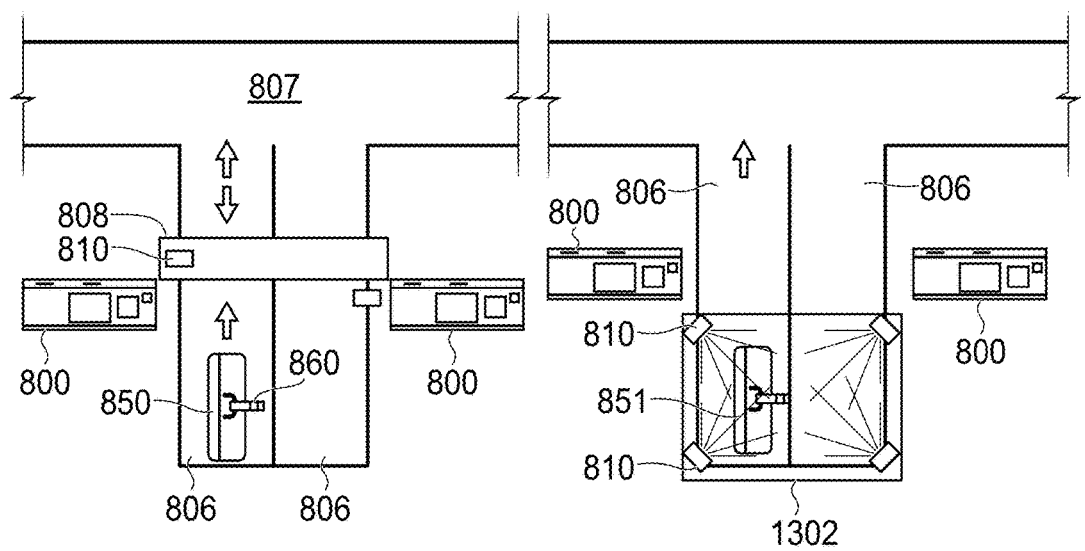
FIG. 8C is a top view of various baggage conveyors 806 with luggage scanning equipment.

FIG. 8C is a top view of various baggage conveyors 806, 807 with luggage scanning equipment. On the left side of the figure, a piece of luggage or other object 850 may be placed on conveyor 806. A tag or label 860 may be secured to the luggage 850. Luggage 850 may then be moved towards scanning arc 808, which may have one or more sensors or cameras 810 for obtaining information from tag 860. This information may be communicated to a computer system. If the information on tag 860 is successfully validated or approved by the system, conveyor 806 may then move luggage 850 further to rear conveyor 807, which may then convey luggage 850 towards a baggage handling area at an airport. For example, the system may verify that a passenger associated with the luggage has checked in to a schedule flight. Conversely, if the information on tag 860 is not successfully validated, conveyor 806 may return luggage 850 towards its original position. This type of tag scanning may be referred to as dynamic scanning.

The right side of FIG. 8C shows a static type of tag scanning where the luggage remains more or less in the same place after it is set down by a passenger. Here, luggage 851 is positioned in a luggage station 1302, which is described in more detail below with reference to FIG. 13. Luggage station 1302 may have one or more sensors or cameras 810 for obtaining information from a tag 861 secured to luggage 851. The sensors or cameras may be positioned in an upper region of luggage station 1302 so that they scan downwardly towards a piece of luggage. The information obtained by a scanner or camera may be communicated to a computer system. If the information on tag 861 is successfully validated or approved by the system, conveyor 806 may move luggage 851 towards rear conveyor 807. Conversely, if the information on tag 861 is not successfully validated, conveyor 806 may leave luggage 851 in its original position. In addition, if an attempt by the system to scan, sense or photograph a tag on a piece of baggage is unsuccessful, for example if the tag is oriented in a position that cannot be read by a scanner, the system may provide a notification (e.g. visual, audible, etc.) to the passenger to relocate or adjust the tag so that it may be properly scanned by the scanner or sensor.

Figure 9:
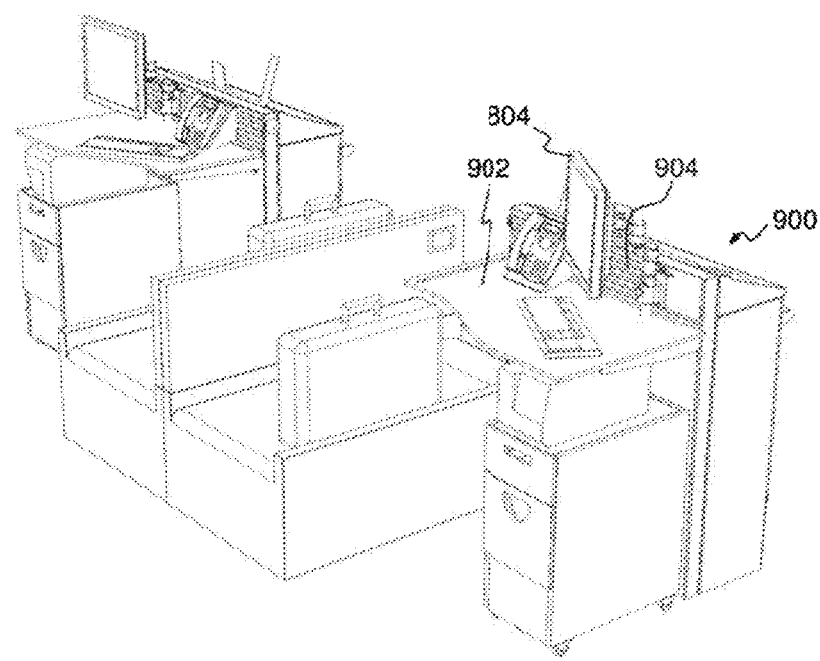
FIG. 9 is a rear perspective view of two counter modules deployed in a standalone configuration similar to FIG. 8A.

FIG. 9 shows a view of the rear side of another embodiment 900 of the present counter module similar to the embodiment of FIG. 8A showing a work surface 902 and a slat wall 904 at the rear side of the counter module. Work surface 902 and slat wall 904 may be used to mount or otherwise support various types of equipment, such as for example a display, keyboard, and phone, to name a few.

Figure 10:
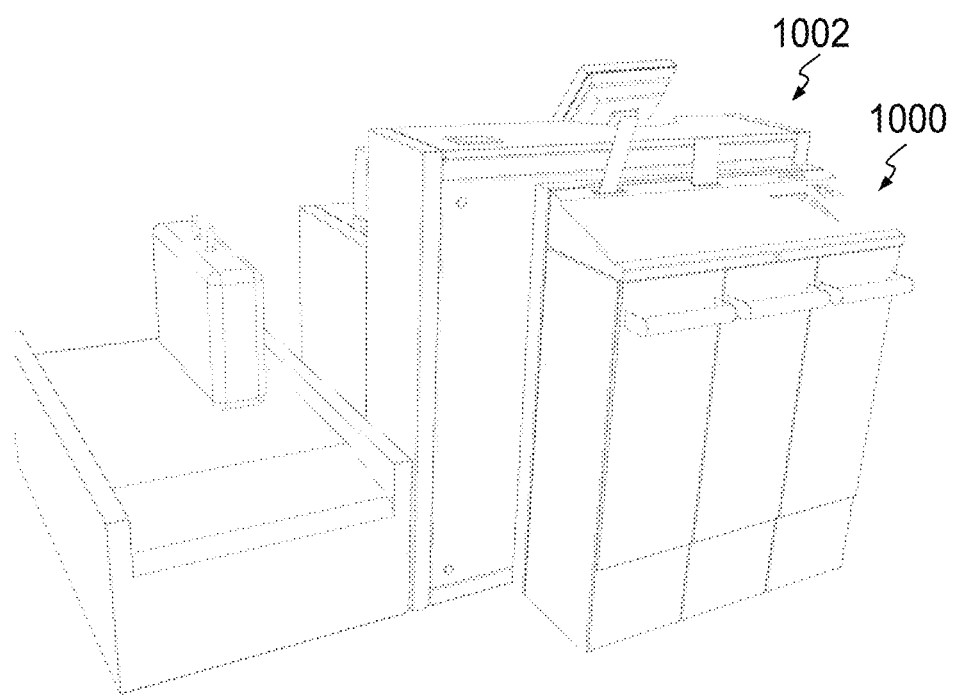
FIG. 10 is a front perspective view of a counter module according to the present disclosure deployed in front of another counter.

FIG. 10 shows a counter module 1000 according to the present disclosure deployed in front of another counter, for example an existing check-in counter 1002. In this sense, counter module 1000 is deployed as an add-on to an existing counter, which may also have equipment for use by a service representative, such as displays, keyboards, printers, etc. A counter module configured as an add-on may be positioned proximate to another existing counter, or may be fastened or otherwise connected to the existing counter.

Figure 11:
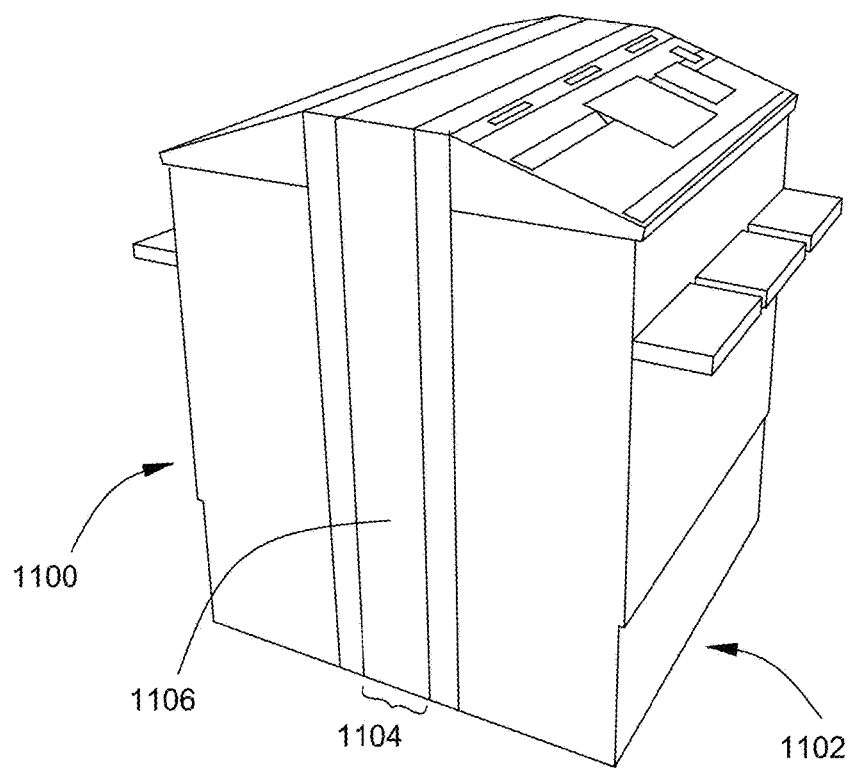
FIG. 11 is a side perspective view of two counter modules positioned in a back-to-back configuration in a satellite deployment.
Figure 12:
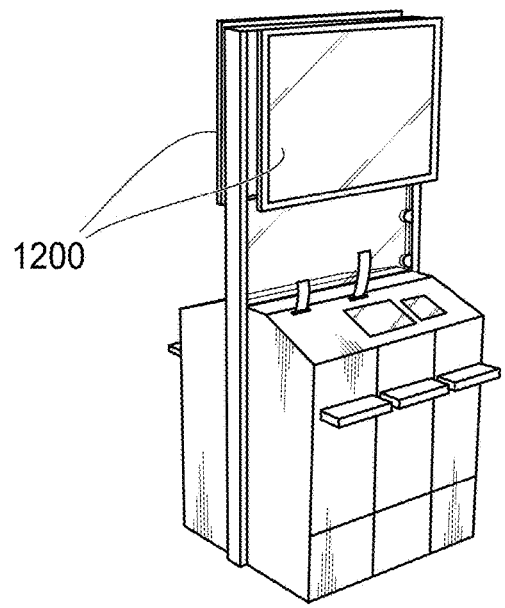
FIG. 12 is a side perspective view of an embodiment similar to the embodiment of FIG. 11 with the addition of displays mounted above the counters.

FIG. 11 shows two counter modules 1100 and 1102 positioned in a back-to-back configuration. A space 1104 may be provided between the two counter modules, which may be used to house equipment such as computer hardware or cabling. The space 1104 may be enclosed with walls, paneling or any other suitable structure 1106. Furthermore, one or more displays or other equipment may be supported above or to the side of the two counter modules. For example, FIG. 12 shows an embodiment with two displays 1200 positioned above the counters so that each display faces in the direction of one of the counters. In at least one embodiment, the height of at least one or more of the displays may be adjustable relative to the top of the counter module.

Therefore the present counter module may be deployed in either standalone configurations or may be integrated with other structures, for example existing check-in counter and or baggage handling structures.

Again making reference to FIG. 1, check-in counter module 100 may comprise one or more equipment modules 200, 202, 204. Although example embodiments of the counter module shown and described herein have or accommodate three equipment modules, this is not intended to be limiting. Various embodiments of the present counter module may accommodate fewer or more than three equipment modules. For instance, one embodiment may accommodate two equipment modules, while another embodiment may accommodate four or more equipment modules.

Figure 6:
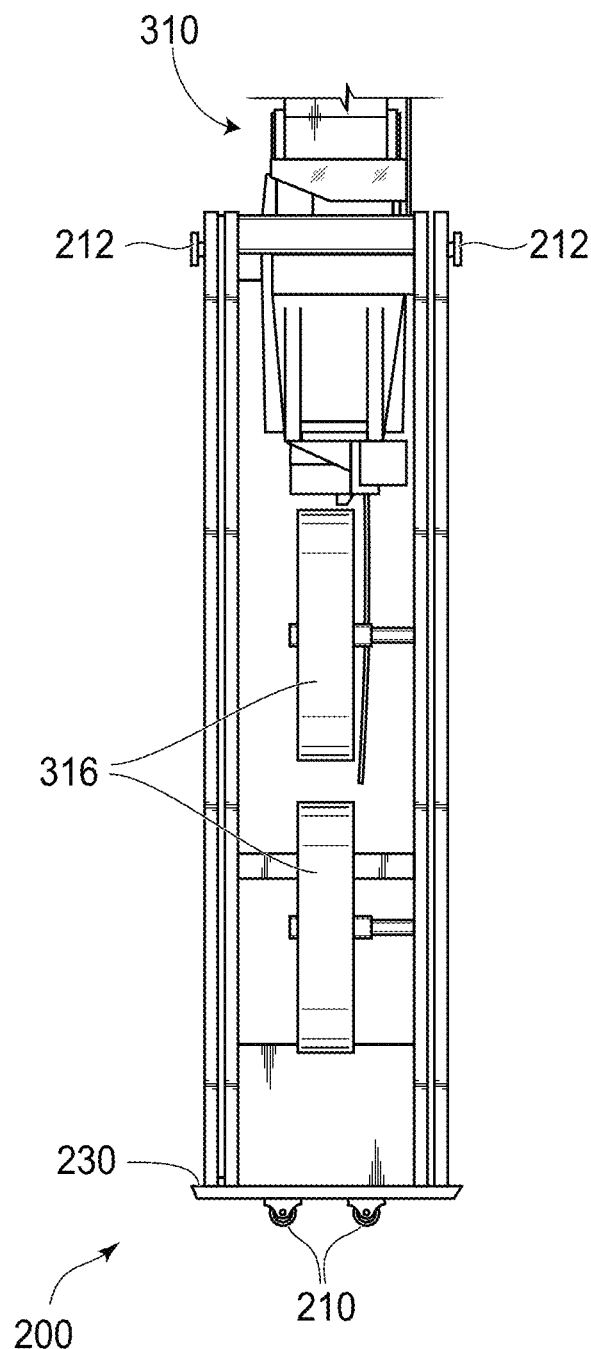
FIG. 6 is a rear perspective view of an equipment module similar to the one shown in FIG. 5.
Figure 6A:
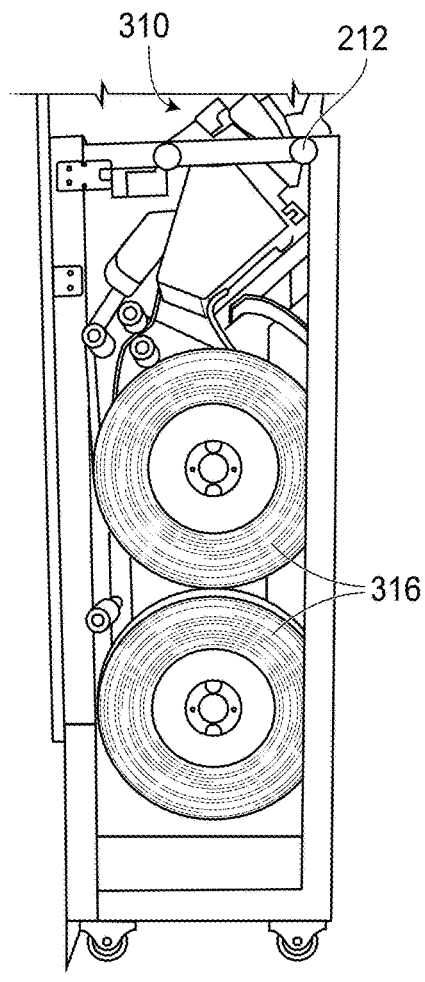
FIG. 6A is a side perspective view of the equipment module shown in FIG. 6.
Figure 6B:
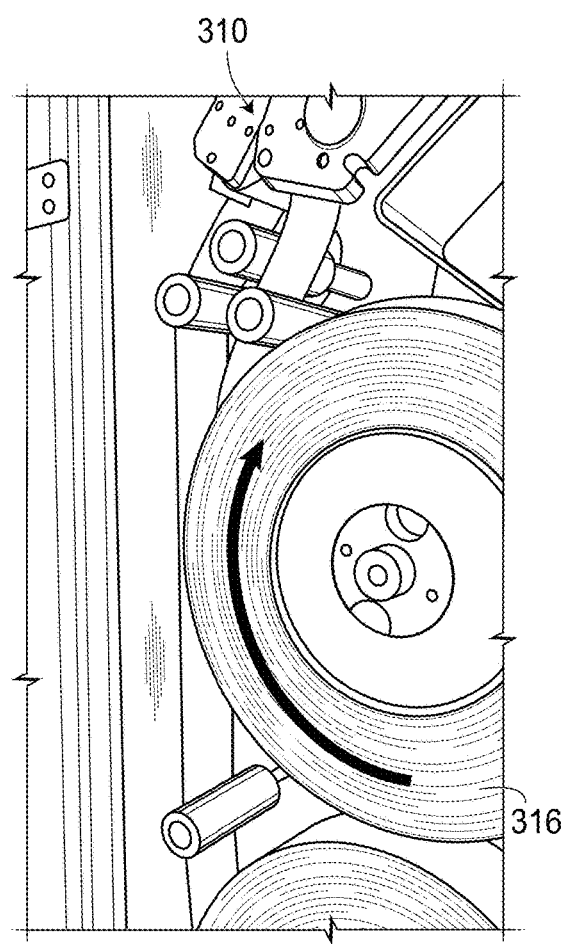
FIG. 6B is a close up side view of a roll of the embodiments shown in FIGS. 6 and 6A.
Figures 6C, 7:
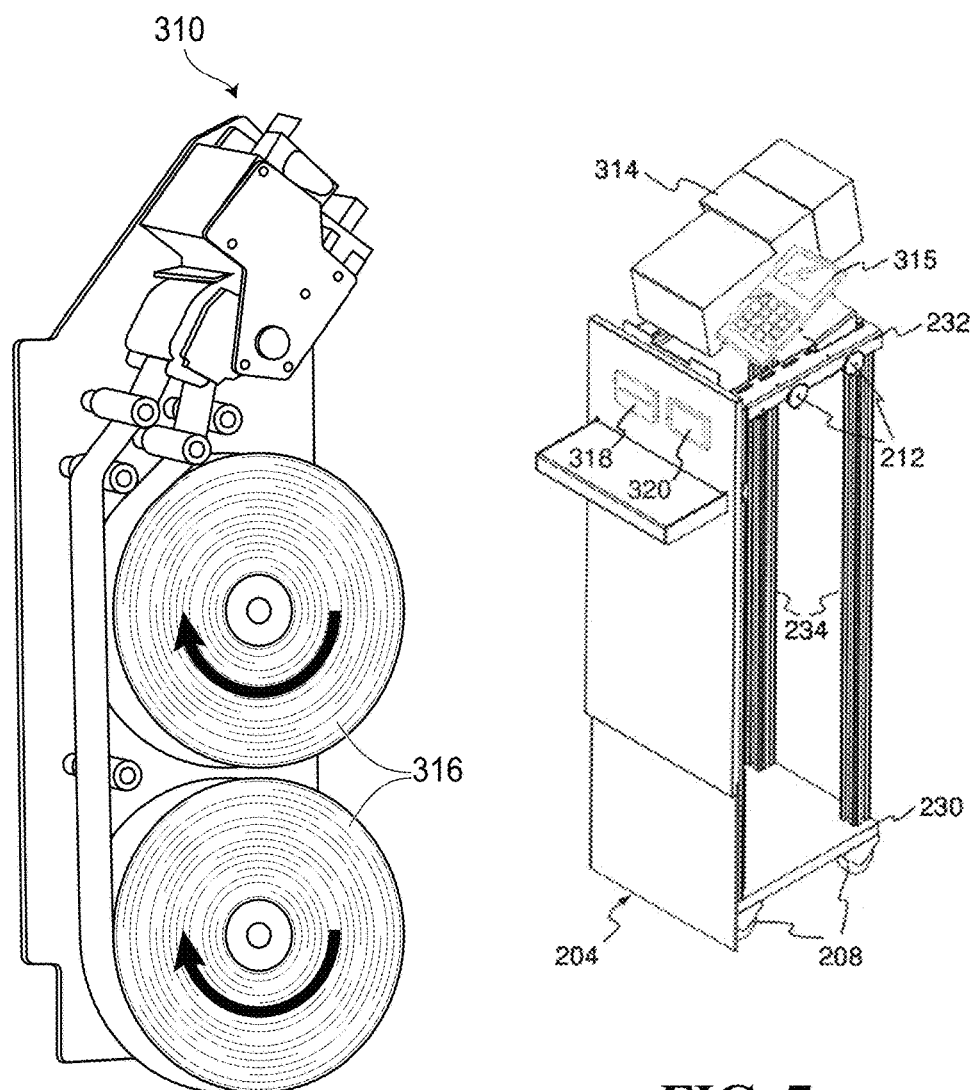
FIG. 6C is a perspective side cutaway view of printing equipment and rolls of an embodiment an equipment module.
FIG. 7 is a front perspective view of an equipment module having scanning and card reading equipment.

Equipment modules 200 and 204 shown in FIG. 1 are shown individually in FIGS. 5 to 7. As shown in FIG. 5, an equipment module may comprise one or more lower frame members 230 and upper frame members 232. Lower and upper frame members may be interconnected by one or more vertical support members 234, which in some embodiments may be in the form of metal extrusions.

Figure 4:
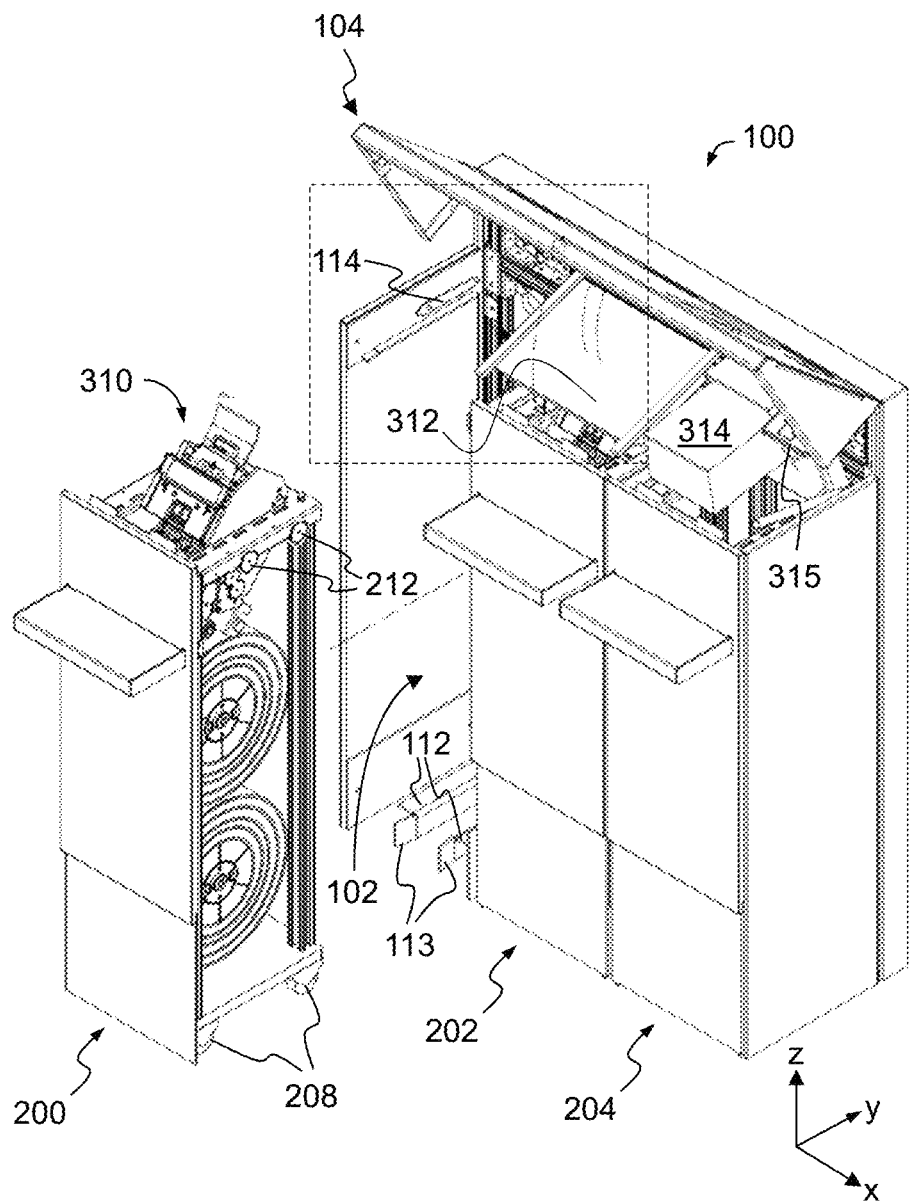
FIG. 4 is a front perspective view of the embodiment of FIG. 1 with the top cover raised and an equipment module removed.

One or more of the equipment modules may be releasably engageable with counter module 100. Counter module 100 may comprise one or more bays 102 for receiving one or more equipment modules therein. For example, FIG. 4 shows equipment module 200 in a disengaged relationship with counter module 100, meaning positioned outwardly of bay 102. An equipment module may be rollingly or slidingly engageable with the counter module. For example, in the embodiment shown in FIG. 4, equipment module 200 may comprise a set of wheels or rollers 208 disposed at its lower end, which allow the equipment module to be rolled into and out of bay 102. Module 100 may in turn have guidance features to receive and guide an equipment module into an appropriate position in bay 102 in the counter module. For example, in the embodiment shown in FIG. 4, counter module may have a lower guidance structure in the form of one or more rails 112 for engaging and guiding a lower portion of an equipment module.

Figure 4A:
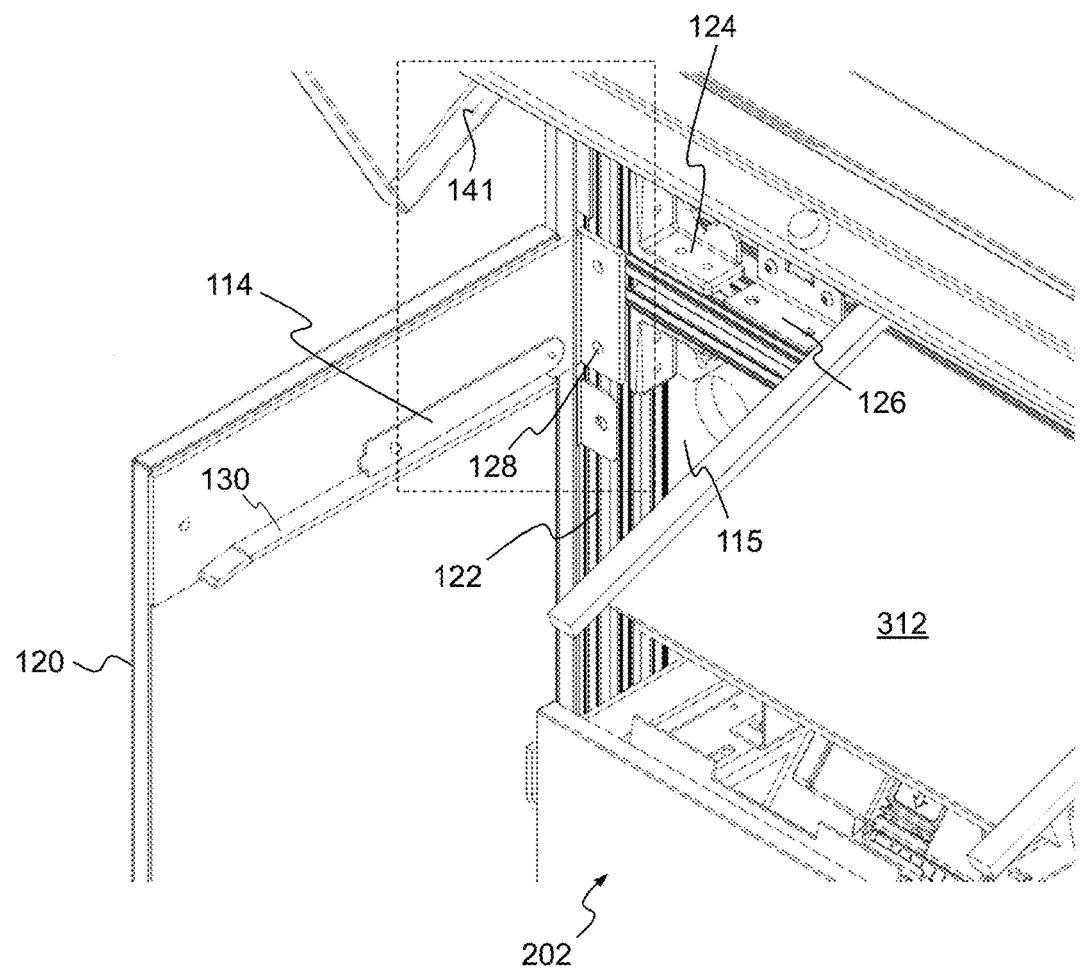
FIG. 4A is a close-up perspective view of the area in FIG. 4 indicated with the dashed line box.
Figure 4A:
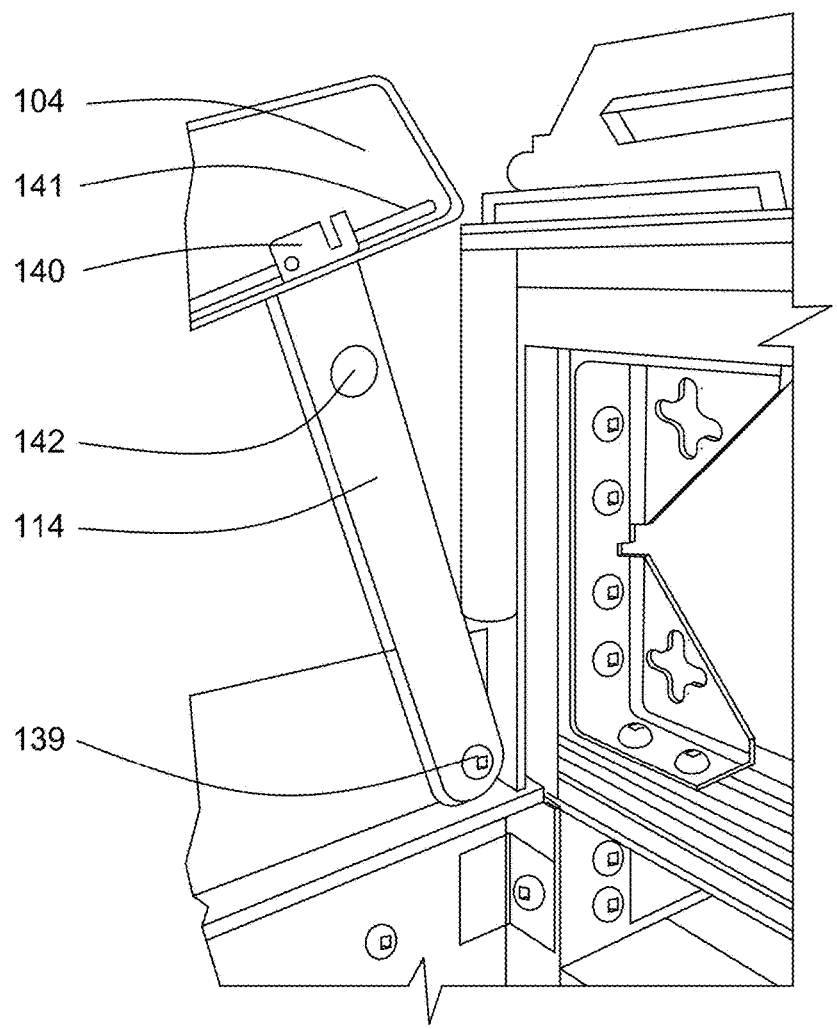
Figure 4B:
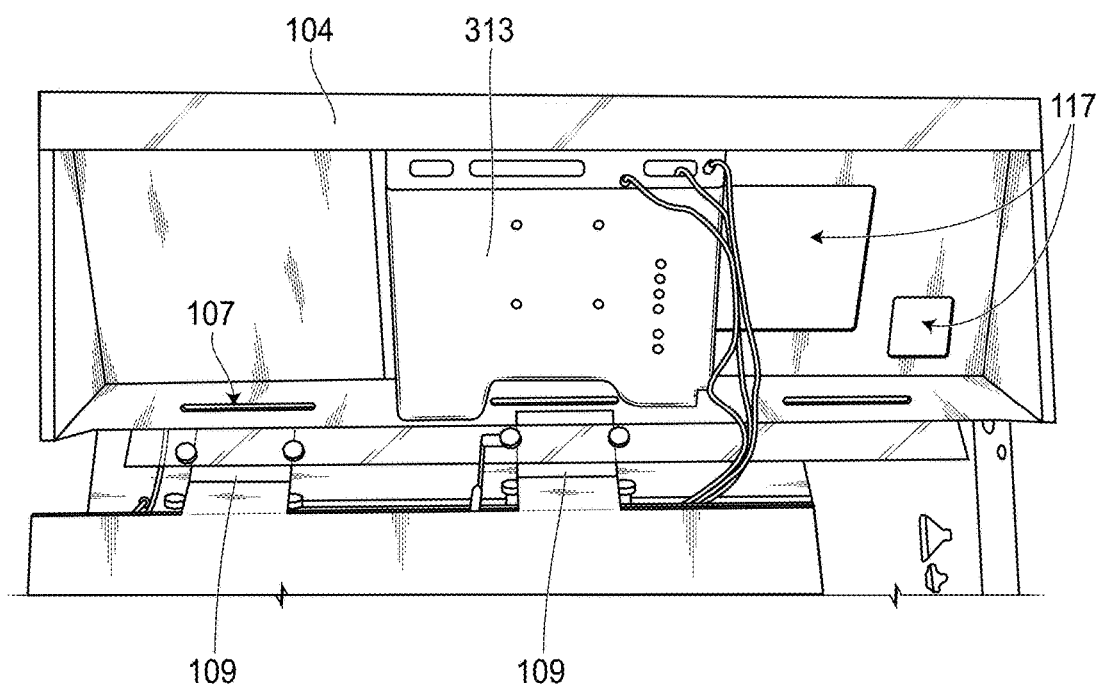
FIG. 4B is a front perspective view of an inner side of the top cover of a counter module in an open position.
Figure 4B:
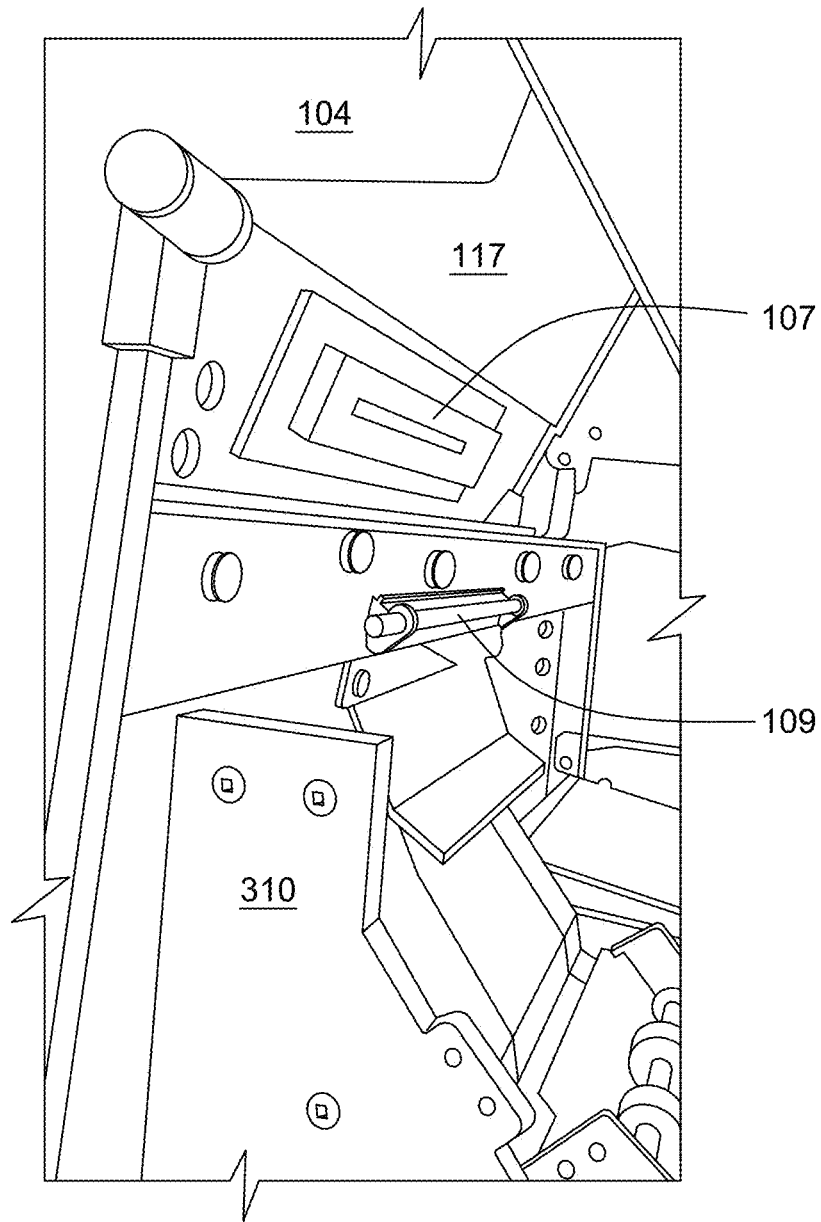
Figure 4C:
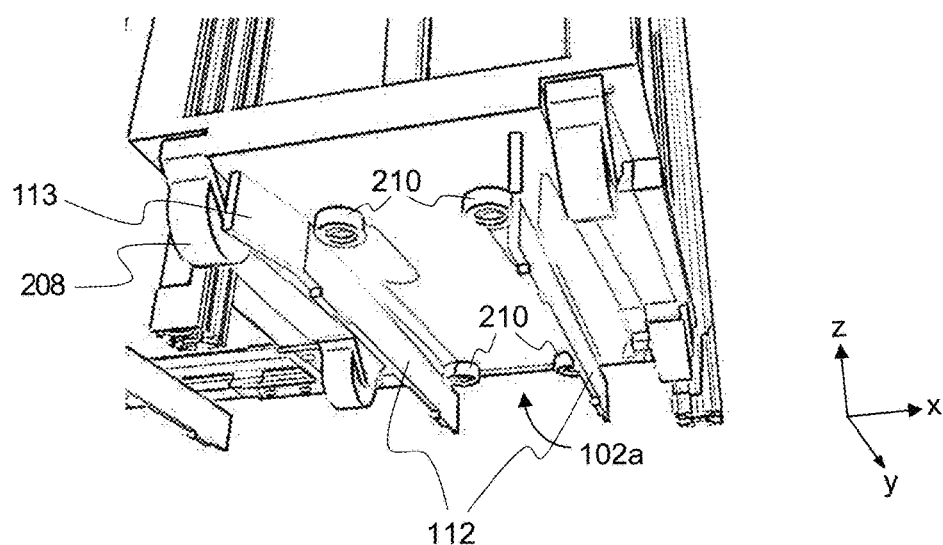
FIG. 4C is a bottom perspective view of an equipment module installed in a counter module.
Figure 4D:
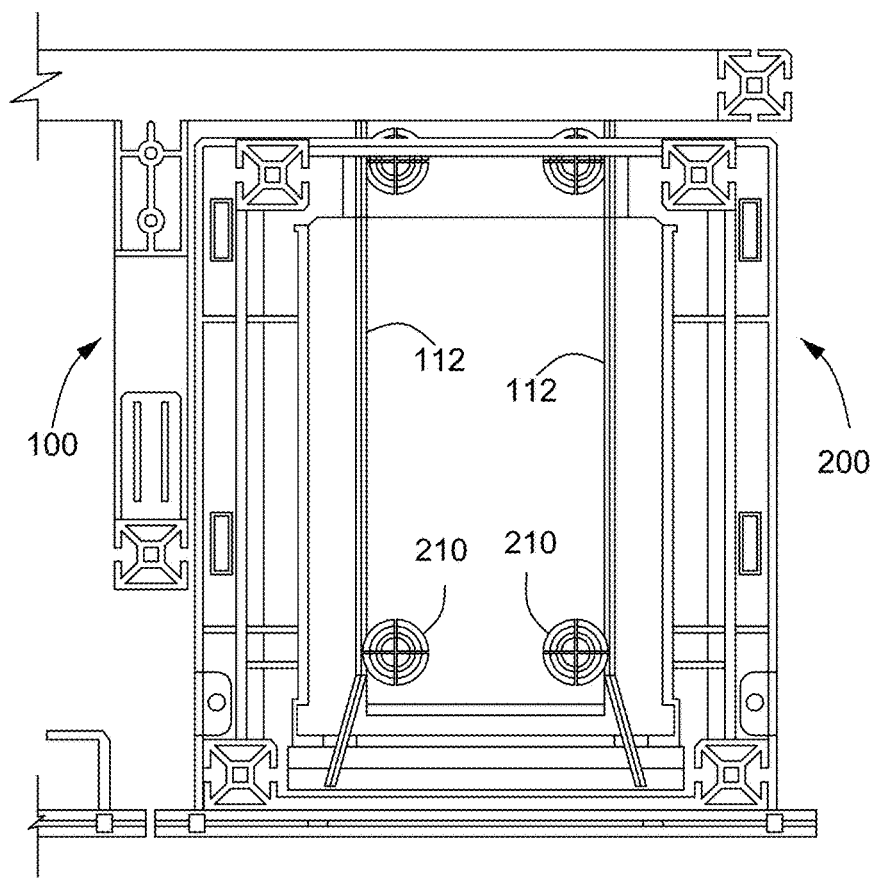
FIG. 4D is a cross sectional view of an equipment module engaged in a counter module taken along an x-y horizontal plane.

FIG. 4C is a bottom view of an equipment module engaged in a counter module. Equipment module 200 may comprise one or more guiding features for engaging counter module 100 to guide the equipment module within the counter. For example, as shown in the embodiment of FIG. 4C, one or more lower guiding features may be in the form of one or more lower rollers 210 for providing alignment of the equipment module relative the counter module. Lower guiding rollers 210 are also shown in FIG. 4D and FIG. 6. As the equipment module is moved towards the counter module, the one or more lower guiding rollers 210 may contact a rail 112 or other surface at the equipment module. In the embodiment shown in FIG. 4C, the equipment module comprises two pairs of rollers 210, namely a front pair (closest to the opening of bay 102) and a rear pair (at the back of bay 102, indicated as 102a in FIG. 4C). One of each pair of rollers may engage one of the respective rails 112. Although the one or more lower guiding features are shown in the form of rollers, this is not meant to be limiting. Other guiding structures may be used, including but not limited to protrusions, pegs, wheels, etc.

The lower guiding features may provide for sideway alignment of an equipment module within a counter module. In other words, the lower guiding features may provide alignment substantially along an x-axis (e.g. horizontally) as indicated in FIG. 4 and FIG. 4C.

In addition, lower guidance structure may be shaped to facilitate proper initial alignment of an equipment module with the counter module. For example, as shown in FIGS. 4C and 4D, a front portion 113 of rail 112 may be openly angled or flared relative the longitudinal axis of rail 112 to engage one or more lower rollers 210 on equipment module.

FIG. 4D shows a top cross sectional view of an equipment module 200 engaged in a counter module 100.

Furthermore, an upper region of equipment module 200 may also comprise one or more upper guiding features 212 for engaging one or more interior surfaces within a counter module. Upper guiding features may contribute to the alignment of the equipment module within the counter module. In the embodiments shown in the Figures, upper guiding features 212 provide for at least vertical alignment within the counter module. In other words, the upper guiding features may provide alignment substantially along a z-axis as indicated in FIG. 4 and FIG. 4C. This may provide for vertical alignment of an equipment module with a counter module that is independent from any floor irregularities.

Figure 4E:
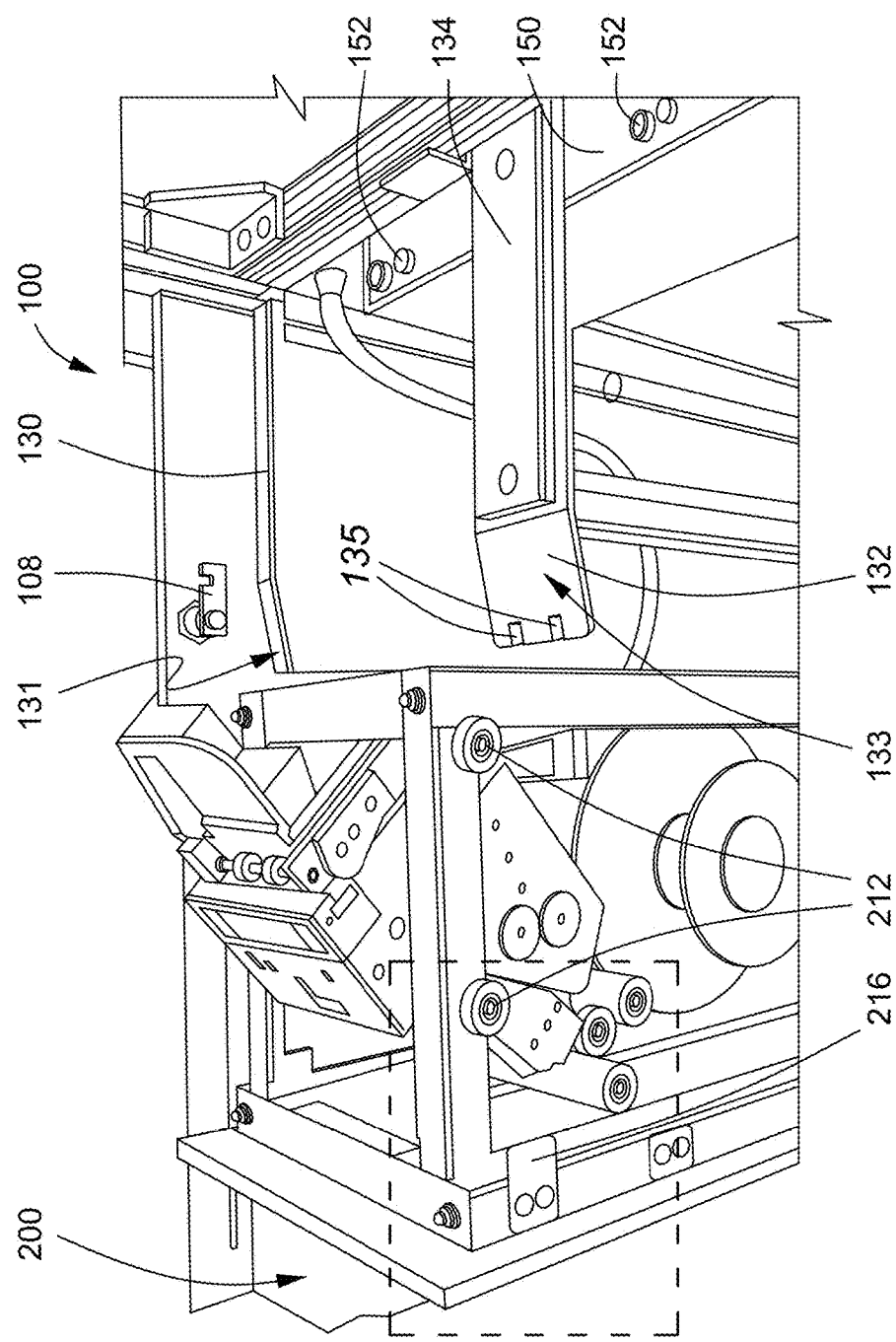
FIG. 4E is a side perspective view of the upper portion of an equipment module positioned in front of a counter module with the top cover in an open position.
Figure 4E:
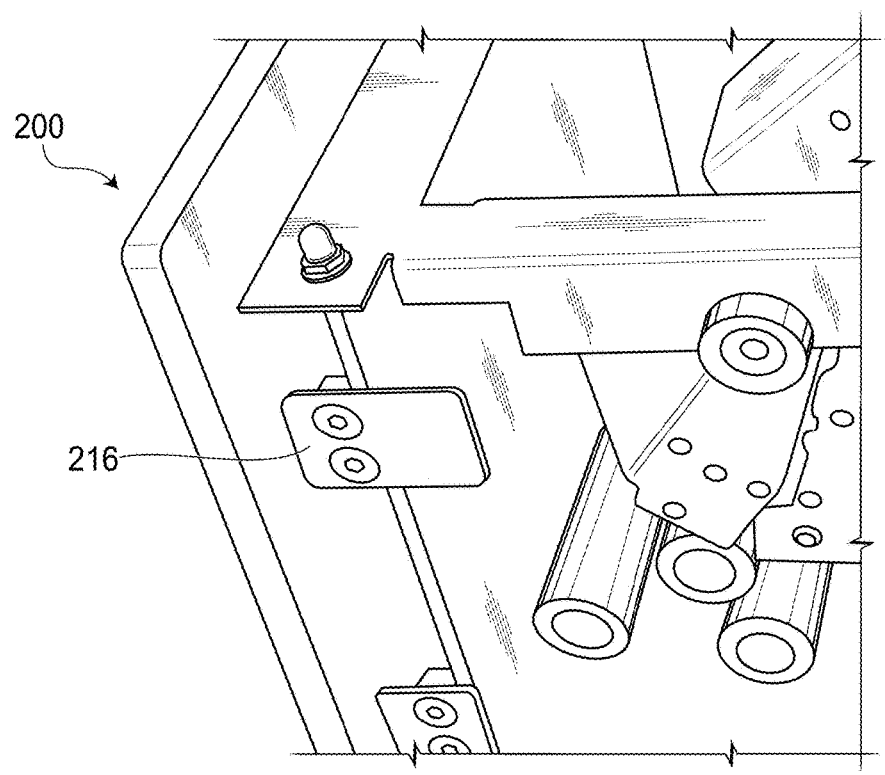

As shown in FIGS. 4, 4E, 4H, 4I, 4J, 5, 6 and 7, upper guiding features may be in the form of rollers 212 and may be disposed on one or both sides of an equipment module. The embodiments shown have two rollers or guiding features 212 on each side of an equipment module, with the exception of the embodiment shown in FIG. 5A, which has three rollers 212 on a given side of the equipment module. In other embodiments, the number of guiding features 212 on each side of an equipment module may be different. Referring to FIG. 4E, the roller 212 that first enters bay 102 (e.g. positioned more towards the rear of equipment module 200, on the right) in counter module 100 may be referred to as a rear roller or guidance member 212, whereas the other of the shown rollers 212 (e.g. positioned more towards the front of equipment module 200, on the left) may be referred to as a front roller 212. Upper guiding rollers 212 may engage one or more corresponding guidance surfaces in the counter module, such as equipment module support surface 130 or equipment module support plate 132. A support surface 130 may be disposed at the opposing ends of a counter module, while one or more support plates 132 may disposed in the counter module between its opposing ends and positioned to be in between adjacent equipment modules. In addition, a support plate 132 may comprise means for further guiding an equipment module into alignment in the counter module. For example, support plate 132 may comprise a guide 134 for guiding one or more upper guiding rollers 212 or other guiding means into sideways (e.g. x-axis or horizontal) alignment. In this way, the rolling bearing surface of roller 212 contacts support plate 132 while the side of roller 212 contacts guide 134.

Furthermore, in at least one embodiment as shown in FIG. 4E, the front or leading portion of one or both of equipment module support surface 130 and plate 132 may be angled or curved for receiving one or more upper guiding rollers 212. For example, in the embodiments shown in the Figures, front portion 131 of support surface 130 and front portion 133 of support plate 132 are angled or curved downwardly. In addition, depending on the relative height of upper guiding rollers 212 to support surface 130 and or support plate 132, the angled front portions 131 and 133 may act as a ramp to raise the equipment module as it is moved into a bay 102 of the counter module. This may provide for alignment of the equipment module relative to the counter module in the vertical direction (e.g. z-axis) despite any unevenness of the ground or floor below the counter module.

In addition, one or both of the counter module and an equipment module may have means to provide front to back alignment (e.g. generally along the y-axis indicated in FIGS. 4 and 4E) of the equipment module within the counter module. For example, one or more surfaces of the equipment module may come into contact with one or more surfaces of the counter module to prevent further rearward movement of the equipment module into the counter module. In at least one embodiment, as shown in FIG. 4E, equipment module may comprise at least one stop member 216 for this purpose. FIG. 4EE is a close up view of the area indicated by the broken line in FIG. 4E showing stop member 216. Stop member 216 is shown having a generally plate like shape, however this is not meant to be limiting. Furthermore, a second stop member (not shown in FIG. 4E or 4EE) may be disposed on the opposite side of equipment module 200.

Figure 4F:
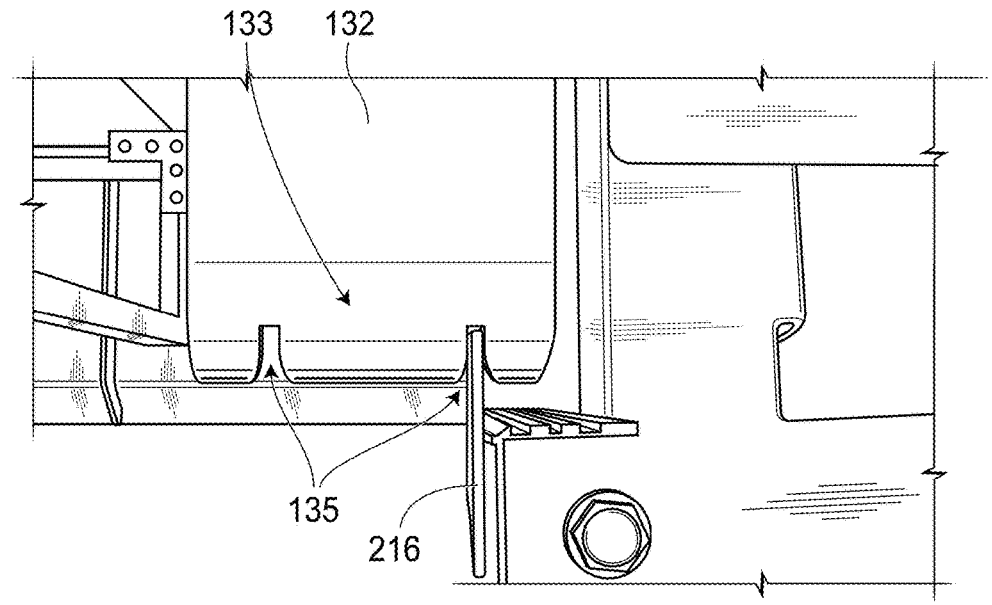
FIG. 4F is a top view of a front portion of an equipment module support plate in a counter module.

The counter module may have corresponding structure for contacting an equipment module and providing alignment of the equipment module therein. In at least one embodiment, as shown in FIGS. 4E and 4F, the one or more stop members 216 of equipment module may be configured to contact the front portion 131 or 133 of equipment module support surface 130 or equipment module support plate 132, respectively. Front portion 131 or 133 may define one or more slits 135 or other opening or surface for receiving stop member 216 of the equipment module. FIG. 4F is a top view of equipment module support plate 132 with stop member 216 having been moved into position within slit 135. Therefore stop member 216 and slit 135 may provide front to back (or "y-axis") alignment of an equipment module within a counter module. In addition, stop member 216 and slit 135 may cooperate to also provide side to side (or "x-axis") alignment of the equipment module relative to the counter module.

Accordingly, the present counter module and equipment module may comprise features for providing alignment of the equipment module relative to the counter module in one or more of side to side (x-axis), front to back (y-axis), and vertical (z-axis) directions.

Figure 4G:
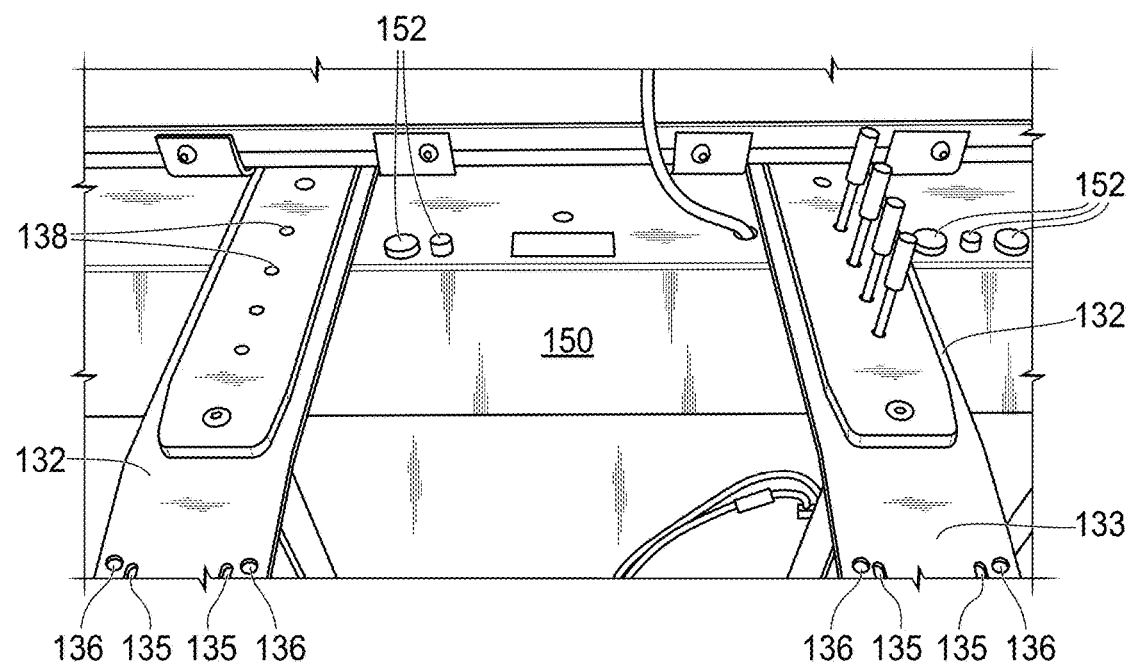
FIG. 4G is a front perspective view of two adjacent equipment module support plates in a counter module.

FIGS. 4G, 4H, 4I and 4J show another embodiment comprising means for securing an equipment module in position within a counter module. FIG. 4G is a front perspective view of two adjacent equipment module support plates 132 in a counter module. The space between plates 132 is adapted to receive an equipment module. A front portion 131 or 133 of equipment module support surface 130 or equipment module support plate 132, respectively, may have at least one hole 136 or other opening formed therein or therethrough. Hole 136 or other opening may be used in combination with an equipment module to releasably secure the equipment module in the counter module.

An equipment module may include structure that cooperates with hole 136 in equipment module support surface 130 or equipment module support plate 132. For example, FIG. 4H shows a close-up view of an equipment module similar to the view of FIG. 4EE. However, stop member 217 in the embodiment in FIG. 4H is different than stop member 216 in FIG. 4EE. FIG. 4HH is an isolated view of stop member 217. In particular, stop member 217 may comprise first and second portions 219a and 219b extending from main portion 218. However, in other embodiments, stop member may comprise only one of first and second portions 219a and 219b. In addition, first and or second portion 219a and 219b may define at least one hole or opening 214 for alignment with hole or opening 136 in equipment module support surface 130 or equipment module support plate 132. Therefore when an equipment module is positioned in the counter module, the one or more holes 214 may be aligned with hole 136 to receiving a pin, rod or other obstruction to releasably secure the equipment module relative to the counter module. In addition, stop member 217 may also define a recess 236 for receiving or otherwise engaging front portion 133 of equipment module support plate 132.

FIG. 4HHH is an isolated view of another embodiment of stop member. Here, stop member 240 is similar to stop member 217 shown in FIGS. 4H and 4HH except that stop member 240 does not define a recess whereas stop member 217 does define a recess 236.

Figure 4I:
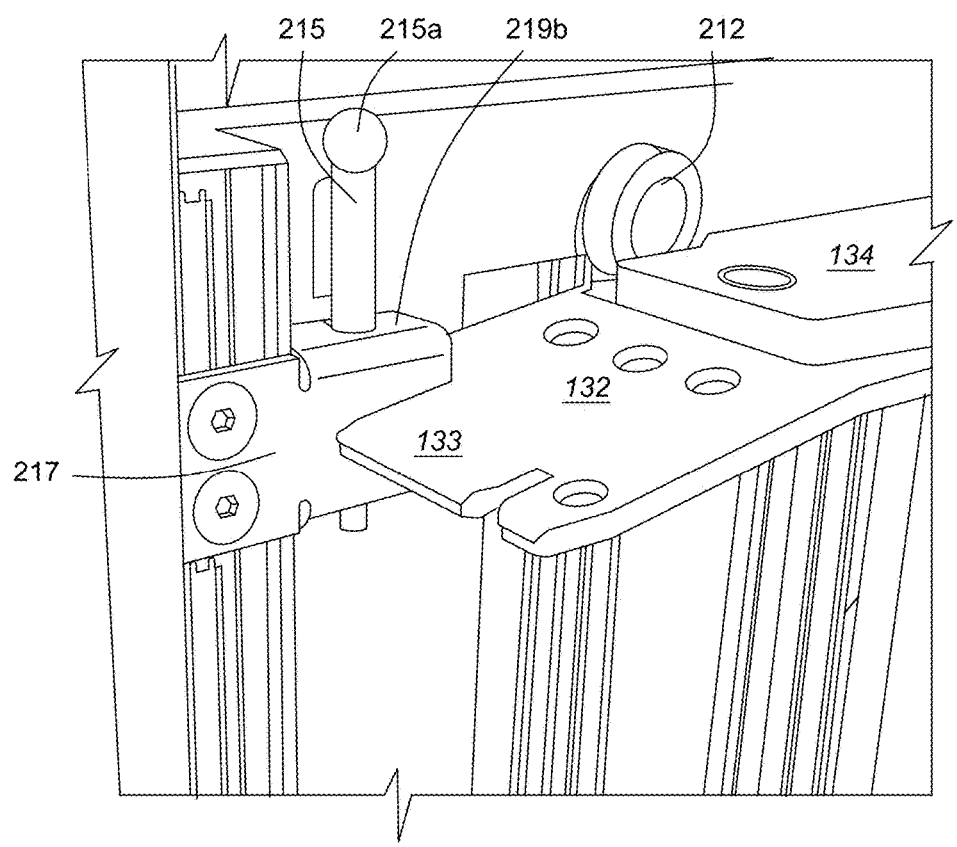
FIG. 4I is a close up perspective view of the stop member shown in FIG. 4 engaged with a front portion of an equipment module support plates of a counter module.

FIG. 4I is a close up view of stop member 217 in an embodiment where the equipment module is positioned within the counter module. Pin 215 is installed so that it passes in or through one or more holes 214 in stop member 217 and in or through one or more holes 136 in equipment module support plate 132 to releasably secure the equipment module to the counter module. An end 215a of pin 215 may have a rounded or bulbous shape for ease of grabbing.

FIG. 4II is a top close-up view of stop member 217 of a counter module engaged with slit 135 of equipment module support plate 132 of a counter module.

FIG. 4III is a top view of an equipment module support plate 132 of a counter module. Two equipment modules 290 and 291 are installed within the counter module.

Figure 4J:
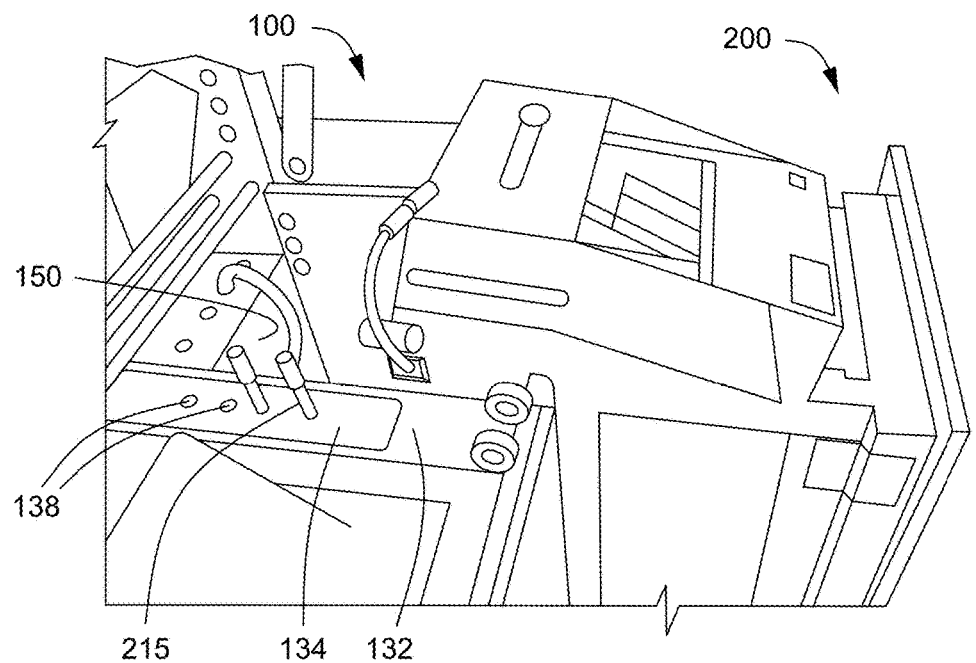
FIG. 4J is a side perspective view of the upper portion of an equipment module positioned partially in a counter module with the top cover in an open position.

FIG. 4J shows an equipment module positioned partially in counter module. In addition, FIGS. 4G and 4J show that in some embodiments, one or more holes 138 may be formed in equipment module support plate 132 or guide 134 for holding pins 215 when the pins are not being used.

Furthermore, counter module 100 may comprise one or more electrical and communications connectors for interfacing with the one or more equipment modules or equipment installed in an equipment module. In at least one embodiment, counter module 100 comprises one or more of these connectors disposed within the counter for automatic connection with one or more corresponding connectors at an equipment module when the equipment module is rolled or otherwise moved into position in the counter module.

In other embodiments, counter module 100 may comprise one or more connectors for manually connecting equipment in an equipment module or elsewhere to the counter module via cabling. For example, FIGS. 4E, 4G and 4J show connectors or ports 152 disposed in a housing 150 towards the rear interior of a counter module. Equipment in equipment modules or in the counter module may be connected to one or more ports using one or more cables.

Figure 4K:
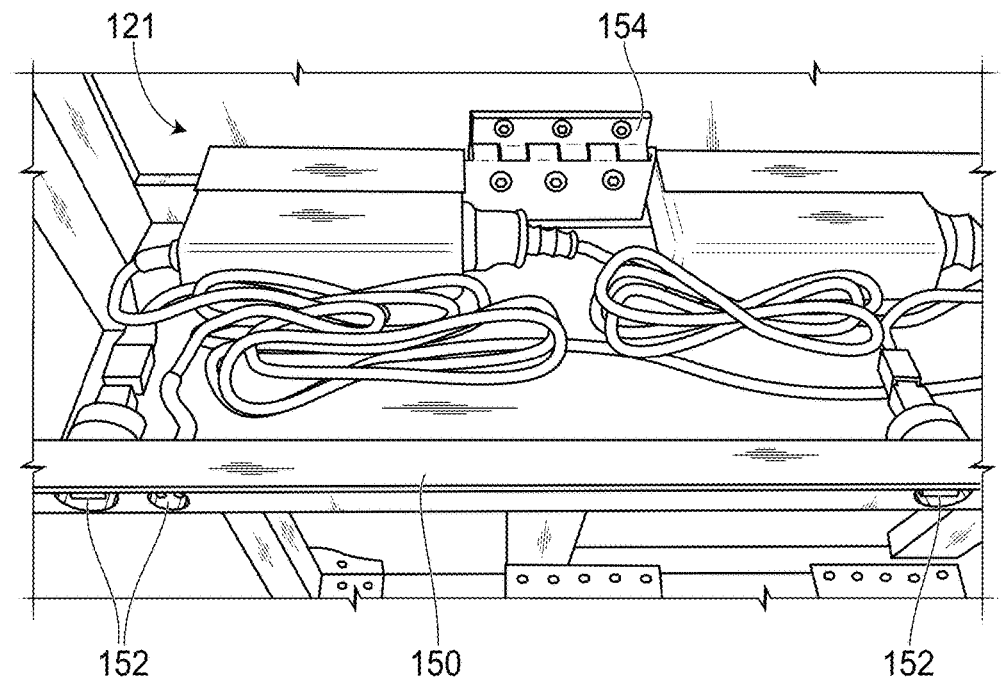
FIG. 4K is a front perspective view of an electrical housing in an open position disposed at a back inner wall of a counter module.

In some embodiments, housing 150 may be releasably connected or hingedly connected to counter module. For example, FIG. 4K shows housing 150 connected at a rear interior side 121 of the counter module by way of one or more hinges 154 and the housing in an open position exposing its interior. As shown in FIG. 4K, housing 150 may house cabling for providing one or both of electrical power and communications to one or more connectors or ports 152. Housing 150 may also house any other suitable equipment, for example one or more power supplies or converters, etc.

In other embodiments (not shown), rather than a hinged mounted housing, housing 150 may comprise a cable tray base, which may be positioned at rear interior side 121 of counter module 100, and a cable tray cover that is releasably connectable to the cable tray base for enclosing the contents of the cable tray base. Wires or cabling in housing 150 may be guided to equipment in an equipment module 200 with one or more flexible cable chains. A flexible cable chain may have one end fixed to housing 150, such as the cable tray base. The other end of the flexible cable chain may be releasably connectable to an equipment module 200 (or equipment on the equipment module). The releasable connection may be any suitable type, including a lift up connector.

In a situation where an equipment module requires servicing or equipment needs to be replaced or repaired, top cover 104 of counter module 100 may be opened, pins 215 may be lifted and parked in holes 138 in equipment module support plate 132 or guide 134, and the equipment module 200 may be pulled out of counter module 100. If necessary, wires or cabling may be unplugged and a flexible cable chain may be disconnected to allow for complete removal of the equipment module 200 from counter module 100.

Figure 4L:
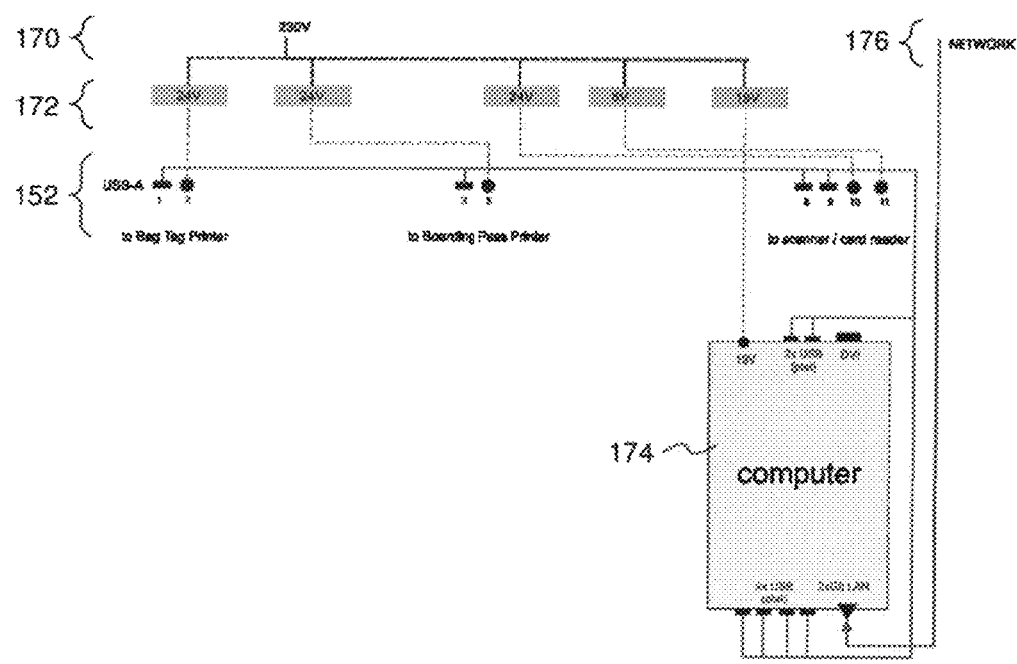
FIG. 4L is an example electrical diagram of wiring of power and communications ports in a counter module.

FIG. 4L is an electrical diagram showing example wiring of some connectors or ports 152 in a counter module. For example, some ports may be provided with electrical power to power equipment in an equipment module or elsewhere in or on counter module, whereas other ports may provide a communication link for the equipment. Electrical power may be from any suitable source(s). The diagram shows a 230V power source 170, but other sources may be used. In addition, electrical power may be modified or converted before it reaches one or more ports 152. For example, one or more power modifiers 172 may be used to step down or step up the source power voltage, current, or to transform alternating current (AC) to direct current (DC), or vice versa.

The communication ports may be connected to any suitable source, for example one or more computers 174. Connections may utilize any suitable interfaces, including universal serial bus (USB). Computer 174 may provide one or more functions, for example controlling or interfacing with equipment in one or more equipment modules or equipment in the counter module. In addition, equipment may be provided with one or more communication links with one or more networks or other sources. For example, computer 174 may have one or more connections 176 to one or more networks.

Furthermore, in at least one embodiment, equipment in one or more equipment modules may communicate wirelessly with other equipment at the counter module or elsewhere. In addition, equipment installed or positioned in the counter module may communicate with other equipment over wired or wireless connections. For example, a scanner installed in one equipment module may communicate with a computer installed in another of the equipment modules.

The communication connections between equipment modules and a counter module may provide access to other computers or servers, possibly over one or more networks. These may include a CUSS system, an airline computer system, an airport computer system, remote maintenance and updating services, the Internet, etc. Furthermore, the communication connections may interface with other nearby equipment, for example equipment at an adjacent counter, baggage handling equipment, scales, cameras, printers, keyboards, scanners, displays, etc.

The above described electrical and communications configurations are only examples and are not intended to be limiting.

FIG. 4A shows an area of counter module 100 indicated by the broken line shown in FIG. 4. Counter module 100 may comprise one or more frame members. In at least one embodiment, as shown, one or more frame members may be in the form of metal extrusions 122. Extrusions 122 may be interconnected using one or more connectors, such as brackets 124. In addition, other components of counter module 100 may be connected to the frame members using any suitable connectors. For example, side panel 120 may be connected to an extrusion of the frame using one or more connectors, such as brackets 128. Similarly, back panel 115 may be connected to one or more extrusions 122 of the frame using one or more connectors 126. The various connectors and brackets may be secured to an extrusion using any suitable type of connector or fastener device, for example by way of one or more screws or bolts, which may in turn engage a re-entrant portion defined by the extrusion. However, any other suitable means for connecting components to the frame may be used.

Figure 3:
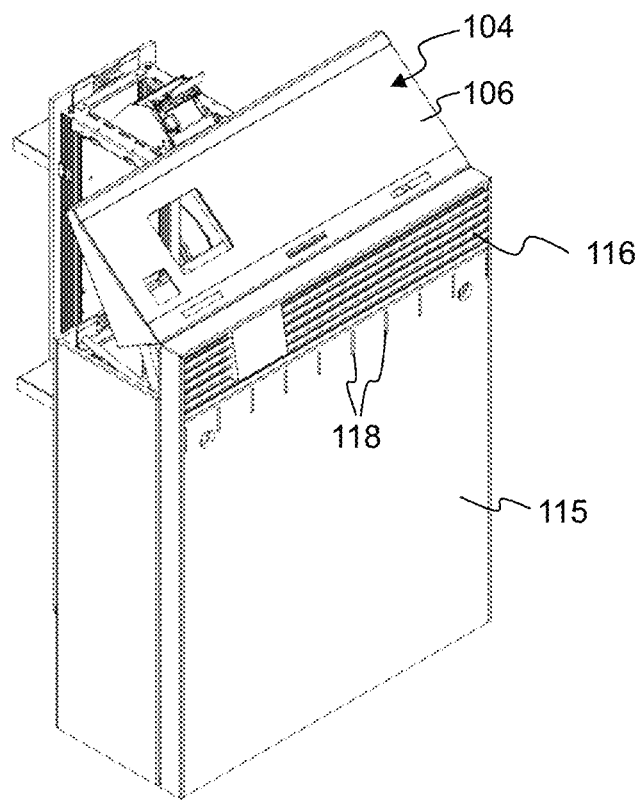
FIG. 3 is a rear perspective view of the embodiment of FIG. 1 with the top cover raised.

In addition, as shown in FIGS. 1, 3 and 4, counter module 100 may comprise a top cover 104. Cover 104 may have a top plate 106 connected thereto. Top plate 106 may comprise a transparent material to allow for the viewing of one or more displays or other equipment located under the top plate, for example a display with touch screen installed in an equipment module or installed on the under side of top plate 106 or top cover 104. Embodiments with a display 312 installed on an equipment module are shown in FIG. 4 and FIG. 4A, the display being mounted on equipment module 202. Furthermore, in at least one embodiment, one or more displays may be fastened or otherwise integrated to the top cover 104 of the counter module. For example, FIG. 4B shows an embodiment having top cover 104 in an open position showing a display 313 disposed on the underside of top cover 104. An equipment module comprising printing equipment may be receivable in the position below the display, for example for printing receipts, boarding passes, baggage tags, etc. However, equipment modules comprising other types of equipment may be installed in the counter module below such a display.

FIG. 4B also shows one or more other openings 117 for providing access to equipment in the counter module, such as for example a scanner, a card reader, etc.

In at least one embodiment, top plate 106 may include a polymer material, such as Lexan™. However, any other suitable material may be used, for example tempered glass. Furthermore, as shown in FIGS. 4B and 4BB, top cover 104 or other portion of module 100 may comprise one or more slots 107 for allowing the passage of baggage tags, tickets, receipts, etc. between the inside and outside of module 100. In at least one embodiment, as shown in FIG. 4B, module 100 may comprise one or more paper guides 109 for guiding paper from a within the module, for example from a printer 310, towards and outwardly of a slot 107. One or more surfaces of a paper guide may comprise a smooth surface, such as Teflon™, for promoting paper to slide within or on the guide.

Again referring to FIG. 1, top cover 104 may be pivotally connected to the frame or other part of counter module 100, for example by one or more hinges 110 to allow the cover to be raised and lowered. The top cover may be raised to, for example, to add or to remove an equipment module or to provide access to equipment therein. Counter module 100 may have means to lock top cover 104 in a closed position, such as lock 108. Although not shown, lock 108 may comprise a latch on the inner side of counter module 100, which when turned with a key rotates to engage a catch on an inner side of top cover 104.

Figure 1A:
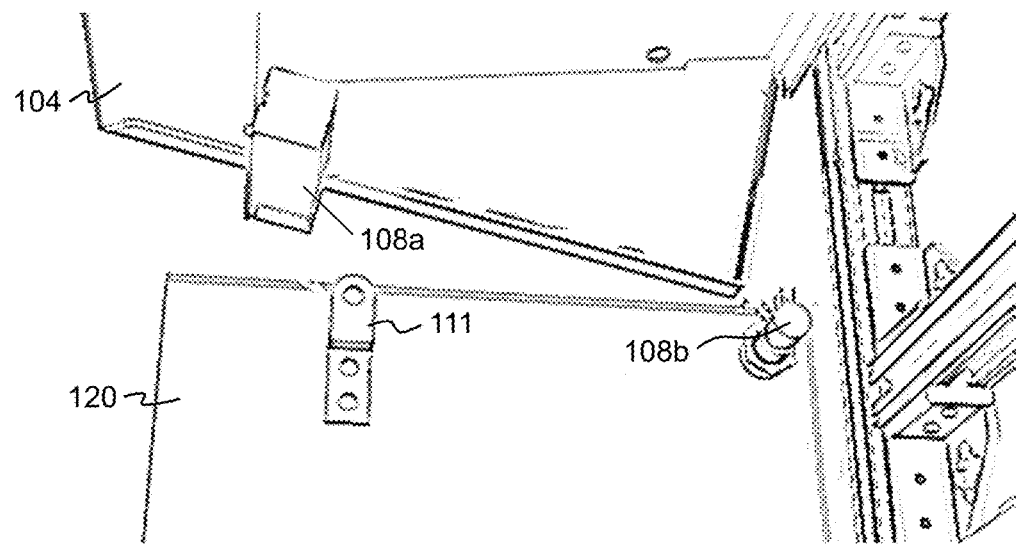
FIG. 1A is an inner view of a side panel and top cover of a counter module showing an electrical locking system.
Figure 1B:
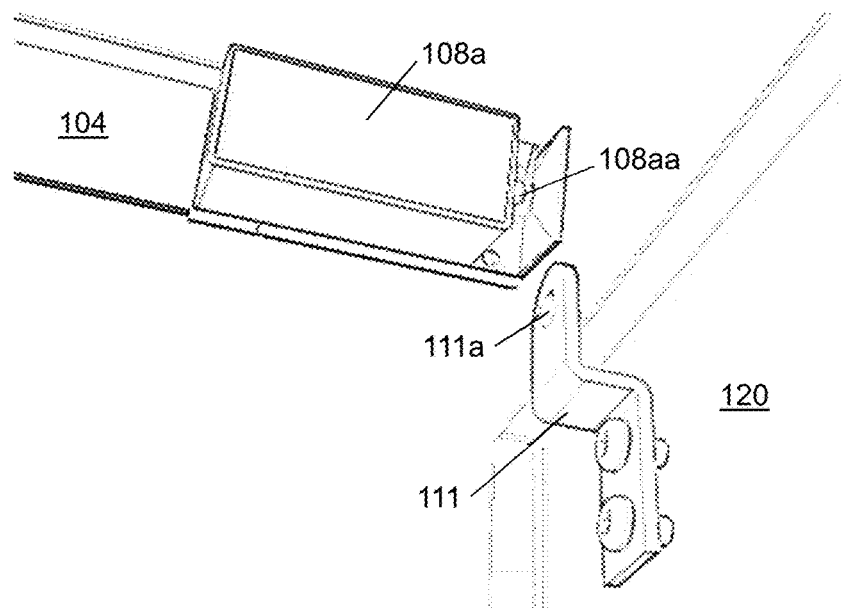
FIG. 1B is an inner view of a side panel and top cover of a counter module showing the electrical locking system of FIG. 1A.

In some embodiments, counter module 100 may have an electrical locking system for locking top cover 104 in a closed position. FIG. 1A is a view of an interior region of a counter module. A locking bracket 111 may be positioned at an inner side of a side panel 120 of counter module 100. An electrical lock mechanism 108*a* may be positioned on top cover 104 for selectively engaging locking bracket 111 when cover 104 is closed. As shown in FIG. 1B, electrical lock mechanism 108*a* may comprise a movable pin 108*aa* for engaging a corresponding notch or hole 111*a* in locking bracket 111. Referring again to FIG. 1A, module 100 may also include an electrical key lock 108*b* for selectively actuating lock mechanism 108*a*. In addition, the electrical locking system may be configured to automatically unlock in the event that the locking system loses its power source.

In addition, the counter may have means to assist in the raising of top cover 104 or to dampen the closing of the cover. As shown in FIG. 4, the means may be in the form of one or more top cover props 114. FIG. 4AA is a close-up view showing prop 114 propping open top cover 104. For example, a proximal end 139 of prop 114 may be pivotally connected to counter 100 whereas a distal end 140 of prop may engage top cover 104 to selectively prop the cover open. Distal end 140 may engage a corresponding portion of top cover 104, such as a slit or other opening 141. In addition, prop 114 may define an opening 142 or other shape for receiving a finger for raising the prop upwards from a horizontal position.

In another embodiment, additionally or alternatively to top cover props 114, counter module 100 may comprise one or more gas springs 104*a*. FIG. 4AAA shows an embodiment having two gas springs 104*a* where each spring 104*a* is positioned between an equipment module support plate 132 and the inner side of top cover 104.

Referring to FIG. 1, a front side of equipment module 200 may comprise a front panel 220 and may have a skirt portion 222. Furthermore, module 200 may have a handle 224, which may be used for moving and positioning the equipment module or as a shelf, for example for resting bags or other objects thereon.

Figure 2:
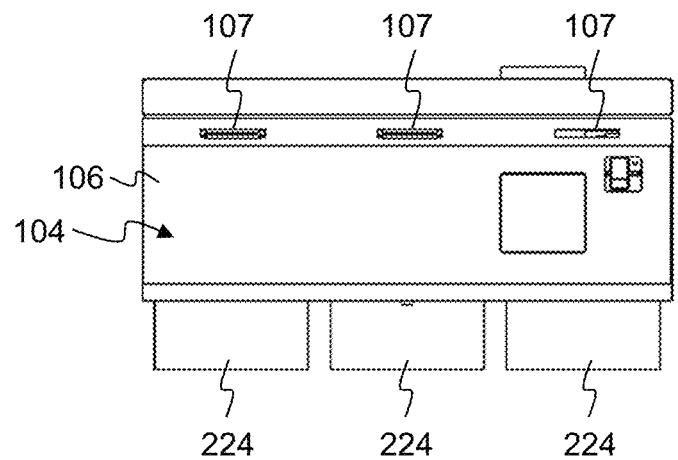
FIG. 2 is a top view of the embodiment of FIG. 1.

FIG. 2 shows a top view of counter module 100, whereas FIG. 3 shows a rear perspective view. The module may have structure for mounting objects from its backside, such as one or more slat wall portions 116. See for example the embodiment shown in FIG. 9, which was described above. The counter may also comprise a rear panel 115. Rear panel 115 may define one or more openings 118, which may provide for ventilation of the interior space defined by the counter and also for the passing of cables and wires.

Each equipment module may contain one or more types of equipment. For example, equipment modules 200, 204 are shown individually in FIGS. 5 to 7. Equipment module 200 shown in FIGS. 5, 6, 6A and 6B comprises printing equipment 310, for example a printer for printing one or more of a boarding pass, ticket or bag tag. FIG. 6 is a rear view of equipment module 200. FIG. 6A is a side perspective view of the equipment module shown in FIG. 6. FIG. 6B is a close up side view of a roll of the embodiments shown in FIGS. 6 and 6A. FIG. 6C is a perspective side cutaway view of printing equipment and rolls of another embodiment an equipment module.

Equipment module 202 shown in FIG. 4 comprises a display 312, for example a touch screen display, a thin-film-transistor liquid-crystal display (TFT LCD), or any other suitable type of display. In addition, as described above, one or more displays may be positioned at top cover 104 of the counter module in addition to or in place of one or more displays installed on one or more equipment modules. The one or more displays may provide a passenger with an interface for performing one or more functions at the counter, such as check-in, passenger identification, seat selection, meal selection, etc.

In addition, one or more of the equipment modules, such as module 200 or 202, may accommodate one or more of printers and printing rolls 316, for example for printing boarding passes, baggage tags, receipts, etc. In at least one embodiment, one equipment module may comprise printing equipment and one or more rolls of tags for printing baggage tags, and another equipment module may comprise printing equipment and one or more rolls for printing one or both of boarding passes and receipts. Example equipment modules are shown in FIGS. 4, 5 and 6.

In at least one embodiment, an equipment module may comprise two rolls 316 and at least one printer 310. Printer 310 may feed the two or more rolls 316 independently. This may allow for multiple rolls to comprise similar or identical paper or other printable material for intensive usage. For example, when one roll is almost empty, the printer or other equipment may provide a notification, for example to a central server or other computer, to notify personnel that the roll is empty. The printer may then automatically switch to another roll in order to continue printing operations.

Feeding printer 310 with multiple rolls 316 may also allow for the rolls to be different. For example, one roll may be used for printing normal baggage tags and another roll may comprise different tags (e.g. different colour, etc.). The roll having the different tags may be automatically selected by the printer when the tag is intended for overweight baggage. The printer may receive a notification that a tag to be printed is for an overweight bag from a scale at the counter, from passenger input at the counter, or from any other source. The different tags may be used to alert ground personnel of overweight or heavy baggage, or to provide any other indication or information. In case of overweight baggage, any extra charges to the passenger may be immediately paid by the passenger at the counter module, for example at a payment terminal such as the one shown in FIG. 7.

Equipment module 204 shown in FIG. 7 comprises scanning equipment 314, for example for scanning barcodes or other information on passports, identification cards, home-print reservations or tickets. In addition, a module may comprise one or more of a user interface for providing input and or output, such as a payment keypad and display 315, a card reader 318 for example to read credit cards, rewards cards, or other types of cards, and an near field communication (NFC) card reader 320. This equipment may allow a user to pay for additional charges, for example for overweight baggage or excess baggage, right at the counter module 100 rather than having to go to a separate counter.

In addition, equipment installed in any of the equipment modules or in or on the counter itself may interface with one or more systems, such as a CUTE or CUSS system, or any other system.

In addition to the equipment described above, one or more equipment modules may be outfitted with one or more computers. A computer may interface with other equipment in the equipment module, such a display, printer, scanner, etc. A computer may also handle communications between one or more of the these devices and one or more networks or other communication links.

Furthermore, an equipment module may comprise a power supply for providing power to one or more pieces of equipment of the module. In addition, one or more equipment modules and or a counter module may have an uninterruptible power supply, such as one or more batteries, for providing temporary power when a primary power source is interrupted.

These types of equipment are only examples and are not intended to be limiting. The present equipment modules may be configured with any type of suitable equipment.

The present disclosure provides a counter module and other equipment that may allow for partial or full self-service passenger check in. Various different types of check-in processes may be supported. For example, a check-in only procedure may be performed. This may include verifying the identity of a passenger and possibly issuing one or both of a boarding pass and a receipt.

In another type of check-in, both check-in and baggage drop may be performed at the counter module. The identity of a passenger may be verified, a boarding pass and or receipt may be issued, one or more baggage tags may be printed, and baggage may be deposited. Baggage may be deposited adjacent a check-in counter module, for example on a conveyor. This may allow for both check-in and baggage drop to be performed at the counter module. An example check-in and baggage drop process may be as follows: passenger identification, selection of any options, printing of boarding pass, scanning of boarding pass, adding or changing options, printing bag tag(s), adding bag tag to luggage, loading luggage on conveyor, system scanning luggage and reading bar codes on bag tag, system opening security luggage door, luggage moving away, security luggage door closing, and receipt ticket being printed. The steps and their ordering are only an example and are not meant to be limiting.

Figure 13:
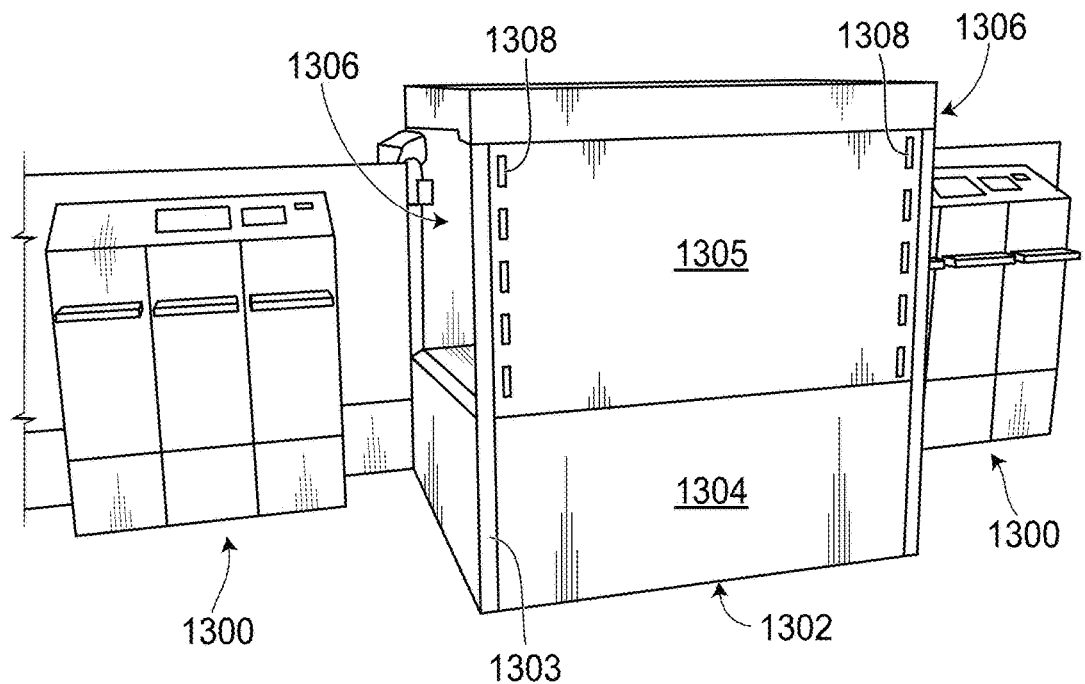
FIG. 13 is a front view of two counter modules and a baggage station.

FIG. 13 shows an example configuration of two counter modules 1300 positioned on opposite sides of a luggage station 1302. Luggage station 1302 may comprise a frame 1303 and one or more walls or panels 1304, 1305 at least partially enclosing an area into which luggage may be deposited, such as one or more luggage conveyors or chutes. Station 1302 may also define one or more openings 1306 for depositing luggage onto a conveyor, chute or other area within the station. The luggage station may also comprise one or more doors (not shown) for closing off the one or more openings 1306. In one embodiment, the one or more doors may be in a closed position to prevent the unauthorized depositing of any baggage or other items. The doors may open after an action is performed, for example a passenger checks in, prints baggage tags, or performs another action at an adjacent counter module. Once a passenger deposits their luggage, the doors may then close.

Luggage station 1302 may comprise one or more visual indicators for indicating whether a check in station or baggage station is open (e.g. in service) or closed (not in service). In some embodiments, a visual indicator may be in the form of one or more lights. In the embodiment of FIG. 13, a vertically oriented light strip 1308 (e.g. light emitting diodes, etc.) may emit green light when the station is in service, and red light when the station is out of service. FIG. 13 shows two light strips 1308. One is for the check in station on the left side of the figure, while the other is for the check in station on the right side of the figure. However, it is to be appreciated that other types and forms of indicator lights may be used.

Luggage station 1302 may comprise one or more sensor or cameras, which may be used, for example, to photograph or scan luggage or one or more labels on a piece of luggage. In some embodiments, the scanning may be dynamic scanning or static scanning, as previously described with reference to FIG. 8C. Furthermore, in some embodiments, luggage station 1302 or other equipment for processing baggage or passengers, such as counter module 100 or an equipment module 200, may comprise a camera for photographing a passenger. A photograph may be taken of a person who checks in using a passport or places a piece of baggage on a conveyor belt or other baggage receiving equipment. This may be used for security purposes, including to associate and store the picture of a person (e.g. face, etc.) with one or more of a passport and piece(s) of baggage.

Alternatively, baggage may be deposited at a location away from the check-in counter module. For example, one or more common baggage conveyors may be provided and shared among several check-in counter modules. Therefore after checking-in, baggage may be brought to the common baggage conveyor and deposited.

The modularity of the present counter system may allow for easy customization of specific equipment at a counter module. One or more equipment modules comprising the desired equipment may be brought to the counter module and then rolled into or otherwise installed in the counter module. In addition, the position of a specific equipment module within the counter module may be customizable. For example, in an embodiment of the counter module configured to receive up to three equipment modules, a specific equipment module may be installed at any of the three positions in the counter module. In other embodiments, the specific equipment in the equipment module may correspond to one or more specific positions in the counter module that have been adapted for the specific equipment module. For example, an equipment module having baggage tag printing equipment may need to be positioned in the counter module in a position having openings in top cover 104 of the counter module to allow for printed tags to be ejected at the top of the counter. Similarly, an equipment module having scanning and or card reading equipment may need corresponding openings in top cover 104 of the counter module.

In addition, the modularity of the present counter system may also allow for easy access to equipment in the equipment modules for maintenance or resupply. For example, an equipment module may be temporary removed from the counter module, refilled with paper rolls, or any other material, and then reinstalled in the counter module. In addition, if an equipment module requires repair or maintenance, or otherwise is to be replaced or substituted, the equipment module may be removed and replaced with another equipment module with very little downtime.

Accordingly, the present structures and systems may provide for improved self-service check-in systems and structures, improved customization of types and positioning of various equipment, and improved ease of access to equipment for maintenance and resupply.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Furthermore, additional features and advantages of the present disclosure will be appreciated by those skilled in the art.

In addition, the embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Various modifications to those embodiments will be readily apparent to those skilled in the art, and the generic principles defined herein may be applied to other embodiments without departing from the spirit or scope of the present disclosure. Thus, the present disclosure is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed:

1. A modular customer service counter for use on a ground surface, comprising:
    a counter module defining at least one equipment module bay, each said bay comprising:
        spaced apart and opposing upper equipment module supports extending generally along a length of the bay, each said upper equipment module support comprising a respective angled leading portion in the form of a ramp; and
        at least one lower guidance support rail extending generally along a length of the bay; and
    an equipment module receivable into and completely removable from one of said at least one bay of the counter module, the equipment module comprising:
        rolling means configured for movement of the equipment module on the ground surface;
        for each said upper equipment module support in the bay, at least one respective upper guidance member for engaging the upper equipment module supports in the bay, the at least one upper guidance member being positioned to engage the ramps of the upper equipment module supports by movement of the equipment module on the ground surface into the bay such that the at least one respective upper guidance member is guided along the upper equipment module supports and the ramps of the upper equipment module supports raise the equipment module off of the ground surface and vertically align the equipment module with the counter module by said movement into the bay; and
        a lower guidance member configured to engage the at least one lower guidance support rail of the bay such that the lower guidance member is guided along the lower guidance support rail, and the equipment module is thereby horizontally aligned by said movement into the bay.

2. The modular customer service counter of claim 1, wherein the at least one lower guidance support rail of the counter module comprises a pair of opposing rails, and the equipment module comprises at least two lower guidance members.

3. The modular customer service counter of claim 2, wherein the equipment module has a front and a rear, the at least two lower guidance members comprise two frontal lower guidance members and two rear lower guidance members, where one of the front lower guidance members and one of the rear lower guidance members engage one of the rails, and the other of the front lower guidance members and the other of the rear lower guidance members engage the other of the rails.

4. The modular customer service counter of claim 1, wherein the equipment module comprises first and second upper guidance members for engaging each of the opposing upper equipment module supports of the bay.

5. The modular customer service counter of claim 1, wherein at least one of the opposing upper equipment module supports of the bay comprises a guide extending along at least part of the length of the upper equipment module support for engaging the upper guidance member of the equipment module.

6. The modular customer service counter of claim 1, wherein the equipment module comprises at least two front upper guidance members and at least one rear upper guidance member, where one of each of the front and rear upper guidance members engages one of the opposing upper equipment module supports and the other of the front upper guidance members engages the other of the opposing upper equipment module supports.

7. The modular customer service counter of claim 1, wherein the equipment module comprises a stop member, and the bay comprises a corresponding alignment member defining a notch for receiving the stop member of the equipment module.

8. The modular customer service counter of claim 7, wherein the stop member defines an opening therethrough, and the alignment member defines a corresponding opening therethrough, such that when the equipment module is fully inserted into the bay, the opening of the stop member aligns with the opening in the alignment member such that an obstruction may be inserted through both openings to releasably secure the equipment module in the bay.

9. The modular customer service counter of claim 1, wherein the counter module comprises two or more equipment module bays arranged in a side-by-side configuration, and wherein the equipment module is compatible with at least two of the bays for selective reception into each of the at least two bays.

10. The modular customer service counter of claim 1, further comprising at least one releasable wired electrical connection between equipment positioned at the equipment module and the counter module, wherein one or more cables providing the connection are supported by a flexible cable chain.

11. The modular customer service counter of claim 10, further comprising one or more electrical connection ports positioned within the bay of the counter module for connecting to one or more cables providing the wired connection to the equipment positioned at the equipment module.

12. The modular customer service counter of claim 1, wherein the equipment module comprises a printer having an output port that is substantially aligned with an opening in a top cover of the counter module when the equipment is installed in the counter module.

13. The modular customer service counter of claim 1, wherein the equipment module comprises at least one of a passport scanner and a card reader that is substantially aligned with an opening in a top cover of the counter module when the equipment is installed in the counter module.

\* \* \* \* \*